US012574740B2

(12) United States Patent
Kim et al.

(10) Patent No.: US 12,574,740 B2
(45) Date of Patent: Mar. 10, 2026

(54) TERMINAL OPERATION METHOD AND DEVICE IN WIRELESS COMMUNICATION SYSTEM

(71) Applicant: LG Electronics Inc., Seoul (KR)

(72) Inventors: Sunhee Kim, Seoul (KR); Sangmin Park, Seoul (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 18/286,621

(22) PCT Filed: Dec. 23, 2021

(86) PCT No.: PCT/KR2021/019743
§ 371 (c)(1),
(2) Date: Oct. 12, 2023

(87) PCT Pub. No.: WO2022/220371
PCT Pub. Date: Oct. 20, 2022

(65) Prior Publication Data
US 2024/0196222 A1 Jun. 13, 2024

(30) Foreign Application Priority Data
Apr. 12, 2021 (KR) ........................ 10-2021-0047305

(51) Int. Cl.
*H04W 12/72* (2021.01)
*H04W 8/18* (2009.01)
*H04W 12/08* (2021.01)

(52) U.S. Cl.
CPC ............. *H04W 12/72* (2021.01); *H04W 8/18* (2013.01); *H04W 12/08* (2013.01)

(58) Field of Classification Search
CPC ........ H04W 12/08; H04W 12/72; H04W 8/18
See application file for complete search history.

(56) References Cited

U.S. PATENT DOCUMENTS

| | | | |
|---|---|---|---|
| 2021/0051577 A1 | 2/2021 | Won | |
| 2021/0099968 A1 | 4/2021 | Tiwari et al. | |
| 2021/0105712 A1 | 4/2021 | Speicher et al. | |
| 2022/0286850 A1* | 9/2022 | Lin ...................... | H04W 12/06 |
| 2023/0397145 A1* | 12/2023 | Talebi Fard ........ | H04W 12/033 |

FOREIGN PATENT DOCUMENTS

JP 2021-052346 A 4/2021

OTHER PUBLICATIONS

3GPP TS 23.501 V17.0.0 (Mar. 2021), 3rd Generation Partnership Project Technical Specification Group Services and System Aspects, study on System architecture for the 5G System (Release 17), Mar. 2021, 491 pages.

(Continued)

*Primary Examiner* — Wayne H Cai
(74) *Attorney, Agent, or Firm* — Fish & Richardson P.C.

(57) ABSTRACT

Disclosed herein a method for operating a terminal in a wireless communication system, and the method may include performing, by a terminal supporting SNPN access, access to a second SNPN based on a credential of a first SNPN as a credential holder, recognizing failure of the access to the second SNPN, and setting validity of the first SNPN in a list of subscribe data as an invalid state based on the failure of the access.

10 Claims, 12 Drawing Sheets

(56) References Cited

OTHER PUBLICATIONS

Alibaba Group, "Solution for SNPN credential provisioning via PLMN," SA WG2 Meeting #139e, S2-2004192, e-meeting, Jun. 1-12, 2020, 9 pages.

Ericsson, "KI#1, New Sol: Solution to support SNPN access using 3rd party credentials via external Credential Provider," SA WG2 Meeting #139E, S2-2004343, May 25-29, 2020, Elbonia, 7 pages.

Extended European Search Report in European Appln. No. 21937104. 4, mailed on Feb. 17, 2025, 12 pages.

LG Electronics, ""List of subscriber data" handling for SNPN supporting AAA-Server for primary authentication and authorization," C1-212233, 3GPP TSG-CT WG1 Meeting #129-e, Electronic Meeting, Apr. 19-23, 2021, 13 pages.

Notice of Allowance in Japanese Appln. No. 2023-562691, mailed on Feb. 18, 2025, 4 pages (with English translation).

Qualcomm Incorporated, Ericsson, "SNPN selection for access to SNPNs using credentials from an entity separate from the SNPN," C1-212072, 3GPP TSG-CT WG1 Meeting #129-e, Electronic Meeting, Apr. 19-23, 2021, 15 pages.

* cited by examiner

FIG. 3 eNB

Figure 3:
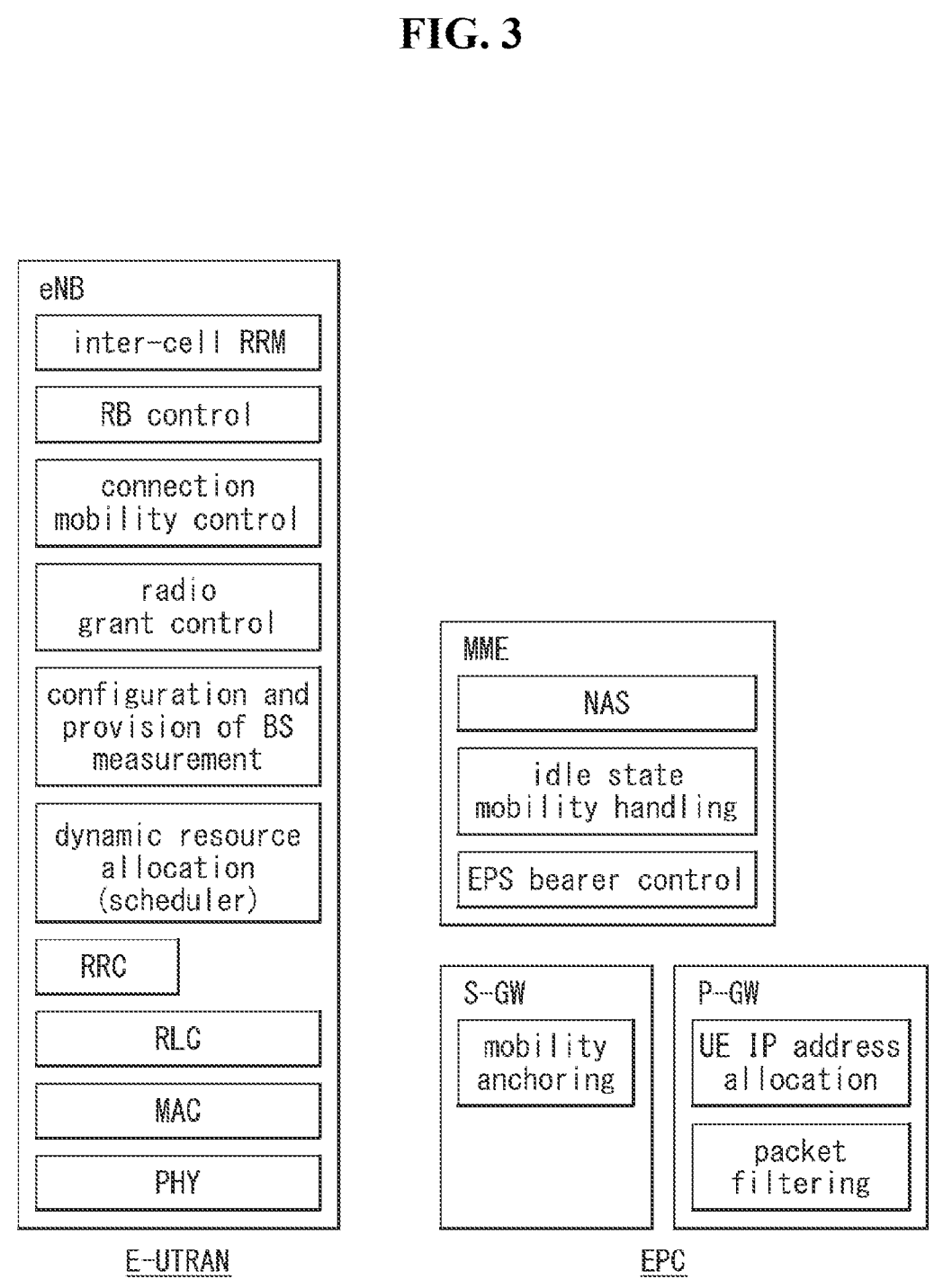

- inter-cell RRM
- RB control
- connection mobility control
- radio grant control
- configuration and provision of BS measurement
- dynamic resource allocation (scheduler)
- RRC
- RLC
- MAC
- PHY

E-UTRAN

MME

- NAS
- idle state mobility handling
- EPS bearer control

S-GW

- mobility anchoring

P-GW

- UE IP address allocation
- packet filtering

EPC

Device(1000)

| | |
|---|---|
| Communication unit(1010)<br>(e.g.,5G Communication unit)<br><br>Communication circuit(1012)<br>(e.g.,processor(s),Memory(s))<br><br>Transceiver(s)(1014)<br>(e.g.,RF unit(s),antenna(s)) | Control unit(1020)<br>(e.g.,processor(s))<br><br>Memory unit(1030)<br>(e.g.,RAM,storage)<br><br>Additional components(1040)<br>(e.g.,power unit/battery, I/O unit,<br>driving unit, computing unit) |

Start

S1801

Perform access to second SNPN
based on credential of first SNPN

S1802

Recognize access failure to second SNPN

S1803

Set validity of first SNPN
in list of subscribe data as invalid
state based on access failure End

TERMINAL OPERATION METHOD AND DEVICE IN WIRELESS COMMUNICATION SYSTEM

CROSS-REFERENCE TO RELATED APPLICATIONS

This application is a National Stage application under 35 U.S.C. § 371 of International Application No. PCT/KR2021/019743, filed on Dec. 23, 2021, which claims the benefit of Korean Patent Application No. 10-2021-0047305, filed on Apr. 12, 2021. The disclosures of the prior applications are incorporated by reference in their entirety.

BACKGROUND

Field

The present disclosure relates to a wireless communication system, and more particularly, to a method and device for operating a terminal. Specifically, the present disclosure relates to a method for storing and processing standalone non public network (SNPN) setting information of a list of subscriber data when a terminal supporting an enhanced NPN (eNPN) performs authentication through an SNPN having no credential.

Description of the Related Art

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

In particular, as a large number of communication devices require a large communication capacity, the enhanced mobile broadband (eMBB) communication technology, as compared to the conventional radio access technology (RAT), is being proposed. In addition, not only massive machine type communications (massive MTC), which provide a variety of services anytime and anywhere by connecting multiple devices and objects, but also a communication system considering a service/user equipment (UE) sensitive to reliability and latency is being proposed. Various technical configurations for this are being proposed.

SUMMARY

The present disclosure may provide a method and device for operating a terminal in a wireless communication system.

The present disclosure may provide a method and device for accessing to an SNPN by a terminal supporting the SNPN through a credential of a credential holder (CH) in a wireless communication system.

The present disclosure may provide a method and device for storing and processing SNPN setting information in a list of subscriber data when authentication for access to an SNPN fails based on a credential of a credential holder in a wireless communication system.

The present disclosure may provide a method and device for using a separate counter when accessing to an SNPN based on a credential of a credential holder in a wireless communication system.

Technical objects to be achieved in the present disclosure are not limited to what is mentioned above, and other technical objects not mentioned therein can be considered from the embodiments of the present disclosure to be described below by those skilled in the art to which a technical configuration of the present disclosure is applied.

The present disclosure a method for operating a terminal in a wireless communication system, the method comprising, performing, by a terminal supporting standalone non public network (SNPN) access, access to a second SNPN based on a credential of a first SNPN as a credential holder, recognizing failure of the access to the second SNPN, and setting validity of the first SNPN in a list of subscribe data as an invalid state based on the failure of the access.

The present disclosure a terminal operating in a wireless communication system, the terminal comprising, at least one transceiver, at least one processor; and at least one memory coupled operably with the at least one processor and storing instructions enabling, when executed, the at least one processor to perform a specific operation, wherein the specific operation is configured to: perform, by a terminal supporting standalone non public network (SNPN) access, access to a second SNPN based on a credential of a first SNPN as a credential holder, recognize failure of the access to the second SNPN, and set validity of the first SNPN in a list of subscribe data as an invalid state based on the failure of the access.

The present disclosure a method for operating a network in a wireless communication system, the method comprising: receiving a registration request message from a terminal; and transmitting a registration reject message to the terminal, wherein the terminal is a terminal supporting standalone non public network (SNPN) access, and wherein the terminal is configured to: perform access to a second SNPN, which is the network, based on a credential of a first SNPN as a credential holder, recognize failure of the access to the second SNPN based on the registration reject message, and set validity of the first SNPN in a list of subscribe data as an invalid state based on the failure of the access.

The present disclosure a network operating in a wireless communication system, the network comprising: at least one transceiver, at least one processor, and at least one memory coupled operably with the at least one processor and storing instructions enabling, when executed, the at least one processor to perform a specific operation, wherein the specific operation controls the transceiver to: receive a registration request message from a terminal, and to transmit a registration reject message to the terminal, wherein the terminal is a terminal supporting standalone non public network (SNPN) access, and wherein the terminal is configured to: perform access to a second SNPN, which is the network, based on a credential of a first SNPN as a credential holder, recognize failure of the access to the second SNPN based on the registration reject message, and set validity of the first SNPN in a list of subscribe data as an invalid state based on the failure of the access.

The present disclosure a device comprising at least one memory and at least one processor functionally coupled with the at least one memory, wherein the at least one processor controls the device to: perform access to a second SNPN based on a credential of a first SNPN as a credential holder, recognize failure of the access to the second SNPN, and set validity of the first SNPN in a list of subscribe data as an invalid state based on the failure of the access, and wherein the device supports access to an SNPN.

The present disclosure a non-transitory computer-readable medium storing at least one instruction, the medium comprising the at least one instruction executable by a processor, wherein the at least one instruction is configured to: perform access to a second SNPN based on a credential of a first SNPN as a credential holder, recognize failure of the access to the second SNPN, and set validity of the first SNPN in a list of subscribe data as an invalid state based on the failure of the access.

In addition, the following matters can be commonly applied.

The present disclosure, further comprising checking whether or not the terminal supports the SNPN access by using a credential of a credential holder.

The present disclosure, based on the terminal supporting the SNPN access by using the credential of the credential holder, the terminal performs access to the second SNPN based on the credential of the first SNPN.

The present disclosure, based on the terminal not supporting the SNPN access by using the credential of the credential holder, the terminal performs the SNPN access based on a credential held by the terminal.

The present disclosure, based on terminal performing access to a third SNPN based on a credential of the third SNPN held by the terminal and recognizing failure of the access to the third SNPN, the terminal sets validity of the third SNPN in a list of subscribe data as an invalid state.

The present disclosure, based on the terminal receiving a first authentication reject message based on access to the second SNPN, the terminal increases a first counter, and wherein, based on the first counter reaching a first value, the terminal recognizes failure of the access to the second SNPN.

The present disclosure, based on the terminal receiving a second authentication reject message based on access to the third SNPN, the terminal increases a second counter, and wherein, based on the second counter reaching a second value, the terminal recognizes failure of the access to the third SNPN.

The present disclosure, the first counter and the second counter are set as different counters.

The present disclosure, the validity of the first SNPN is maintained until a power supply is switched on again or the list of subscribe data is updated.

The present disclosure may provide a method and device for operating a terminal in a wireless communication system.

The present disclosure may provide a method for accessing to an SNPN by a terminal supporting the SNPN through a credential of a credential holder (CH) in a wireless communication system.

The present disclosure may recognize an SNPN, where authentication failure occurs, through a method for storing and processing SNPN setting information in a list of subscriber data when authentication for access to the SNPN fails based on a credential of a credential holder in a wireless communication system.

The present disclosure may prevent occurrence of unnecessary signaling through a method for storing and processing SNPN setting information in a list of subscriber data when authentication for access to an SNPN fails based on a credential of a credential holder in a wireless communication system.

The present disclosure may provide a method for using a separate counter when accessing to an SNPN based on a credential of a credential holder in a wireless communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

FIG. 3 is a view illustrating a general E-URTAN and an example of an architecture of an evolved packet core (EPC).

MODE FOR INVENTION

Figure 1:
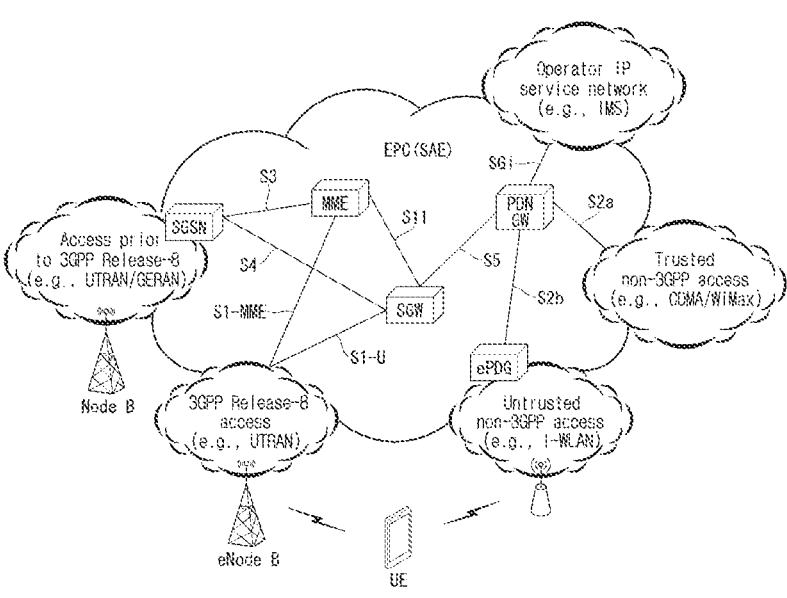
FIG. 1 is a view illustrating various reference points.

Following embodiments are achieved by combination of structural elements and features of the present disclosure in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present disclosure unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition. "a or an", "one", "the" and similar related words may be used as the sense of including both a singular representation and a plural representation unless it is indicated in the context describing the present specification (especially in the context of the following claims) to be different from this specification or is clearly contradicted by the context.

In this specification, the embodiments of the present disclosure are described with focus on the relationship of data reception and transmission between a base station and a mobile station. Herein, the base station means a terminal node of a network that performs direct communication with the mobile station. In this document, a specific operation, which is described to be performed by a base station, may be performed by an upper node of the base station in some cases.

That is, in a network consisting of a plurality of network nodes including a base station, various operations for communicating with a mobile station may be performed by the base station or network nodes other than the base station. Herein, "base station" may be replaced by such terms as "fixed station", "Node B", "eNode B (eNB)", "gNode B (gNB)", "ng-eNB", "advanced base station (ABS)", or "access point".

Also, in the embodiments of the present disclosure, "terminal" may be replaced by such terms as "user equipment (UE)", "mobile station (MS)", "subscriber station (SS)", "mobile subscriber station (MSS)", "mobile terminal" or "advanced mobile station (AMS)".

In addition, a transmission end refers to a fixed and/or mobile node that provides a data service or a voice service, and a reception end means a fixed and/or mobile node that receives a data service or a voice service. Accordingly, in the case of an uplink, a mobile station may be a transmission end, and a base station may be a reception end. Likewise, in the case of a downlink, a mobile station may be a reception end, and a base station may be a transmission end.

The embodiments of the present disclosure may be supported by standard documents disclosed in at least one of the following radio access systems: an IEEE 802 xx system, a 3rd generation partnership project (3GPP) system, a 3GPP long term evolution (LTE) system, a 3GPP 5th generation (5G) new radio (NR) system and a 3GPP2 system, and in particular, the embodiments of the present disclosure may be supported by the following documents: 3GPP TS (technical specification) 38.211, 3GPP TS 38.212, 3GPP TS 38.213, 3GPP TS 38.321, and 3GPP TS 38.331.

In addition, the embodiments of the present disclosure are applicable to another radio access system but is not limited to the above-described system. As an example, they are applicable to a system applied after a 3GPP 5G NR system and are not limited to a specific system.

That is, obvious steps and parts not described in the embodiments of the present disclosure may be described with reference to the above documents. In addition, all the terms disclosed in this document may be explained by the standard document.

Hereinafter, a preferred embodiment according to the present disclosure will be described in detail with reference to accompanying drawings. Detailed descriptions disclosed below together with accompanying drawings are intended to describe example embodiments of the present disclosure and not intended to show any sole embodiment in which a technical configuration of the present disclosure can be implemented.

In addition, specific terms used in the embodiments of the present disclosure are provided to help understand the present disclosure, and such specific terms may be used in any other modified forms without departing from the technical idea of the present disclosure.

The following technology may be applied to various radio access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA) and the like.

For clarity of explanation, the descriptions below are based on a 3GPP communication system (e.g. LTE, NR and the like), but the technical idea of the present disclosure is not limited thereto. LTE may mean a technology after 3GPP TS 36.xxx Release 8. Specifically, the LTE technology after 3GPP TS 36.xxx Release 10 may be referred to as LTE-A, and the one after 3GPP TS 36.xxx Release 13 may be referred to as LTE-A pro. 3GPP NR may mean a technology after TS 38.xxx Release 15. 3GPP 6G may mean a technology after TS Release 17 and/or Release 18. "xxx' means the specific number of a standard document. LTE/NR/6G may be referred to collectively as 3GPP system.

Contents described in standard documents released earlier than the present disclosure may be referred to for the background art, terms and abbreviations used in the present disclosure. As an example, 36.xxx and 38.xxx standard documents may be referred to.

Terms used in the present disclosure are defined as follows.

IP Multimedia Subsystem or IP Multimedia Core Network Subsystem (IMS): an architectural framework for providing standardization for delivering voice or other multimedia services on internet protocol (IP).

Universal Mobile Telecommunication System (UMTS): the 3rd generation mobile communication technology based on global system for mobile communication (GSM) developed by the 3GPP.

Evolved Packet System (EPS): a network system consisting of an evolved packet core (EPC), that is an IP based packet switched core network, and an access network such as LTE and UTRAN. The EPS is a network of an evolved version of a universal mobile telecommunications system (UMTS).

NodeB: a base station of a UMTS network. It is installed outdoor, and its coverage has a scale of a macro cell.

eNodeB: a base station of an EPS network. It is installed outdoor, and its coverage has a scale of a macro cell.

Home NodeB: it is installed indoors as a base station of the UMTS network, and its coverage has a scale of a macro cell.

Home eNodeB: it is installed indoors as a base station of the EPS network, and its coverage has a scale of a macro cell.

User Equipment (UE): the UE can be called a terminal, a mobile equipment (ME), a mobile station (MS), etc. The UE can be a portable device such as a notebook computer, a cellular phone, a personal digital assistant (PDA), a smart phone, and a multimedia device, or a fixed device such as a personal computer (PC) and a vehicle-mounted device. The term of UE may refer to an MTC UE in the description related to MTC.

Machine Type Communication (MTC): communication performed by machines without human intervention. It may be called Machine-to-Machine (M2M) communication.

MTC terminal (MTC UE or MTC device or MRT apparatus): a terminal (e.g., a vending machine, meter, etc.) having a communication function (e.g., communication with an MTC server over PLMN) over a mobile communication network and performing a MTC function.

Radio Access Network (RAN): a unit including a Node B and a radio network controller (RNC) controlling the Node B in the 3GPP network. The RAN exists at a UE end and provides a connection to a core network.

Home Location Register (HLR)/Home Subscriber Server (HSS): a database containing subscriber information within the 3GPP network. The HSS can perform functions such as configuration storage, identity management, user state storage, etc.

Public Land Mobile Network (PLMN): a network configured for the purpose of providing mobile communication services to individuals. The PLMN can be configured for each operator.

Non-Access Stratum (NAS): a functional layer for exchanging signalling and a traffic message between a UE and a core network at the UMTS and EPS protocol stacks. The NAS mainly functions to support mobility of the UE and support a session management procedure for establishing and maintaining an IP connection between the UE and PDN GW.

Service Capability Exposure Function (SCEF): an entity within the 3GPP architecture for service capability exposure that provides a means to safely expose the services and capabilities provided by 3GPP network interfaces.

Mobility Management Entity (MME): A network node in the EPS network which performs mobility management and session management functions.

Packet Data Network Gateway (PDN-GW): A network node in the EPS network which performs UE IP address allocation, packet screening and filtering, and charging data collection functions.

Serving GW (Serving Gateway): A network node in the EPS network which performs functions such as mobility anchor, packet routing, idle mode packet buffering, and triggering paging for the ME of MME.

Policy and Charging Rule Function (PCRF): A node in the EPS network which performs policy decision to dynamically apply differentiated QoS and billing policies for each service flow.

Open Mobile Alliance Device Management (OMA DM): A protocol designed to manage mobile devices, such as mobile phones, PDAs, and portable computers, which performs functions such as device configuration, firmware upgrade, and error report.

Operation Administration and Maintenance (OAM): A network management function group which provides network fault indication, performance information, and data and diagnostic functions.

Packet Data Network (PDN): A network in which a server (e.g., MMS server, WAP server, etc.) supporting a specific service is located.

PDN connection: A connection from the UE to the PDN, i.e., the association (connection) between the UE represented by the IP address and the PDN represented by the APN.

EPS Mobility Management (EMM): a sublayer of the NAS layer, where the EMM may be in an "EMM-Registered" or "EMM-Deregistered" state depending on whether the UE is network attached or detached.

EMM Connection Management (ECM) connection: A signaling connection for the exchange of NAS messages, established between the UE and the MME. An ECM connection is a logical connection consisting of an RRC connection between the UE and an eNB and Si signaling connection between the eNB and the MME. When the ECM connection is established/terminated, the RRC and Si signaling connections are established/terminated as well. To the UE, the established ECM connection means having an RRC connection established with the eNB, and to the MME, it means having an S1 signaling connection established with the eNB. Depending on whether the NAS signaling connection, i.e., the ECM connection is established, the ECM may have an "ECM-Connected" or "ECM-Idle" state.

Access-Stratum (AS): It includes a protocol stack between the UE and the radio (or access) network and is responsible for transmitting data and network control signals.

NAS configuration Management Object (MO): A management object (MO) used to configure the UE with parameters related to NAS functionality.

Packet Data Network (PDN): A network in which a server (e.g., multimedia messaging service (MMS) server, wireless application protocol (WAP) server, etc.) supporting a specific service is located.

PDN connection: a logical connection between the UE and the PDN, represented by one IP address (one IPv4 address and/or one IPv6 prefix).

Access Point Name (APN): a string that refers to or identifies a PDN. In order to access the requested service or network, it goes through a specific P-GW, which means a predefined name (string) in the network so that the P-GW can be found. (e.g., internet.mnc012.mcc345.gprs)

Access Network Discovery and Selection Function (ANDSF): it is a network entity and provides policies that allow the UE to discover and select an available access on a per operator basis.

EPC path (or infrastructure data path): a user plane communication path through EPC.

E-UTRAN Radio Access Bearer (E-RAB): it refers to the concatenation of a S1 bearer and a corresponding data radio bearer. If there is an E-RAB, there is an one-to-one mapping between the E-RAB and the EPS bearer of the NAS.

GPRS Tunneling Protocol (GTP): a group of IP-based communications protocols used to carry general packet radio service (GPRS) within GSM, UMTS and LTE networks. Within the 3GPP architecture, GTP and proxy mobile IPv6-based interfaces are specified on various interface points. GTP can be decomposed into several protocols (e.g., GTP-C, GTP-U and GTP'). GTP-C is used within a GPRS core network for signalling between gateway GPRS support nodes (GGSN) and serving GPRS support nodes (SGSN). GTP-C allows the SGSN to activate a session (e.g., PDN context activation), deactivate the same session, adjust the quality of service parameters, or renew a session for a subscriber, that has just operated from another SGSN, for the user. GTP-U is used to carry user data within the GPRS core network and between the radio access network and the core network.

Hereinafter, the present disclosure is described based on the terms defined as above.

Three major requirement areas of 5G include (1) an enhanced mobile broadband (eMBB) area, (2) a massive machine type communication (mMTC) area, and (3) an ultra-reliable and low latency communications (URLLC) area.

Some use cases may require multiple areas for optimization, and other use case may be focused on only one key performance indicator (KPI). 5G supports these various use cases in a flexible and reliable method.

5G System Architecture to which the Present Disclosure is Applicable

A 5G system is an advanced technology from 4G LTE mobile communication technology and supports a new radio access technology (RAT), extended long term evolution (eLTE) as an extended technology of LTE, non-3GPP access (e.g., wireless local area network (WLAN) access), etc. through the evolution of the existing mobile communication network structure or a clean-state structure.

The 5G system is defined based on a service, and an interaction between network functions (NFs) in an architecture for the 5G system can be represented in two ways as follows.

Reference point representation: indicates an interaction between NF services in NFs described by a point-to-point reference point (e.g., N11) between two NFs (e.g., AMF and SMF).

Service-based representation: network functions (e.g., AMF) within a control plane (CP) allow other authenticated network functions to access its services. The representation also includes a point-to-point reference point, if necessary.

Overview of 3GPP System

FIG. 1 illustrates various reference points.

In an example of a network structure illustrated in FIG. 1, the SGW and the PDN GW are configured as separate gateways, but the two gateways may be implemented according to a single gateway configuration option.

The MME is an element to perform signaling and control functions for supporting access to the network connection of the UE, allocation, tracking, paging, roaming, and handover of network resources, and so on. The MME controls control plane functions related to subscribers and session management. The MME manages a large number of eNBs and performs signaling of the conventional gateway selection for handover to other 2G/3G networks. Further, the MME performs functions such as security procedures, terminal-to-network session handling, idle terminal location management, and so on.

The SGSN handles all packet data such as mobility management and authentication of the user for another 3GPP network (e.g., GPRS network).

The ePDG serves as a security node for an untrusted non-3GPP network (e.g., I-WLAN, Wi-Fi hotspot, etc.)

As described with reference to FIG. 1, the UE with IP capability can access the IP service network (e.g., IMS) provided by a service provider (i.e., operator) via various components within the EPC based on the non-3GPP access as well as the 3GPP access.

For example, reference points such as S1-U and S1-MME can connect two functions present in different functional entities. The 3GPP system defines a conceptual link connecting two functions present in different functional entities of E-UTRAN and EPC, as a reference point. The following Table 1 summarizes reference points illustrated in FIG. 4. In addition to the example of Table 1, various reference points can exist depending on the network structure.

TABLE 1

| Reference point | description |
|---|---|
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management between Serving GW and PDN GW. It is used for Serving GW relocation due to UE mobility and if the Serving GW needs to connect to a non-collocated PDN GW for the required PDN connectivity. |
| S11 | Reference point for the control plane protocol between MME and SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points illustrated in FIG. 1, S2a and S2b correspond to non-3GPP interfaces. S2a is a reference point to provide a user plane with related control and mobility support between the trusted non-3GPP access and the PDN GW. S2b is a reference point to provide a user plane with related control and mobility support between the ePDG and the PDN GW.

Figure 2:
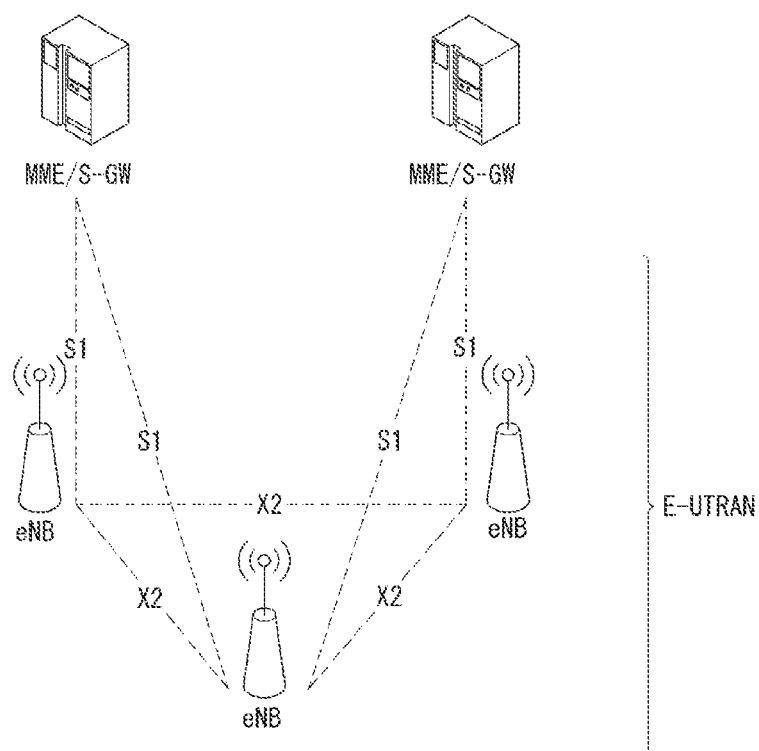
FIG. 2 is a view illustrating an example of a network structure of an evolved universal terrestrial radio access network (E-UTRAN) to which the present disclosure is applicable.

FIG. 2 illustrates an example of a network structure of an evolved universal terrestrial radio access network (E-UTRAN) to which the present disclosure is applicable.

An E-UTRAN system is an evolved version of the existing UTRAN system and may be, for example, 3GPP LTE/LTE-A system. Communication networks are widely deployed to provide various communication services such as voice (e.g., voice over Internet protocol (VoIP)) through IMS and packet data.

Referring to FIG. 2, an E-UMTS network includes an E-UTRAN, an EPC, and one or more UEs. The E-UTRAN consists of eNBs that provide control plane and user plane protocols to the UE, and the eNBs are interconnected with each other by means of the X2 interface.

X2 user plane (X2-U) interface is defined between the eNBs. The X2-U interface provides non-guaranteed delivery of a user plane packet data unit (PDU). X2 control plane (X2-CP) interface is defined between two neighboring eNBs. The X2-CP performs functions of context delivery between the eNBs, control of user plane tunnel between a source eNB and a target eNB, delivery of handover-related messages, uplink load management, and the like.

The eNB is connected to the UE via a radio interface and is connected to an evolved packet core (EPC) by means of the S1 interface.

S1 user plane (S1-U) interface is defined between the eNB and a serving gateway (S-GW). S1 control plane interface (S1-MME) is defined between the eNB and a mobility management entity (MME). The S1 interface performs functions of evolved packet system (EPS) bearer service management, non-access stratum (NAS) signaling transport, network sharing, MME load balancing, and so on. The Si interface supports many-to-many-relation between the eNB and the MME/S-GW.

The MME can perform various functions such as NAS signaling security, access stratum (AS) security control, inter-core network (CN) node signaling for supporting mobility between 3GPP access networks, idle mode UE reachability (including control and execution of paging retransmission), tracking area identity (TAI) management (for UE in idle and active modes), PDN GW and SGW selection, MME selection for handover with MME change, SGSN selection for handover to 2G or 3G 3GPP access networks, roaming, authentication, bearer management functions including dedicated bearer establishment, support of public warning system (PWS) (including earthquake and tsunami warning system (ETWS) and commercial mobile alert system (CMAS)) message transmission, and the like.

FIG. 3 is a view illustrating a general E-URTAN and an example of an architecture of an evolved packet core (EPC).

As illustrated in FIG. 3, the eNB can perform functions such as routing to gateway while radio resource control (RRC) connection is activated, scheduling and transmission of paging messages, scheduling and transmission of a broadcast channel (BCH), dynamic allocation of resources in uplink and downlink to the UE, configuration and provision for the measurement of the eNB, radio bearer control, radio admission control, and connection mobility control. The eNB can perform functions such as paging situation in the EPC, management of an LTE IDLE state, ciphering of a user plane, SAE bearer control, and ciphering and integrity protection of NAS signaling.

Annex J of 3GPP TR 23.799 shows various architectures by combining 5G and 4G. An architecture using NR and NGC is disclosed in 3GPP TS 23.501.

Figure 4:
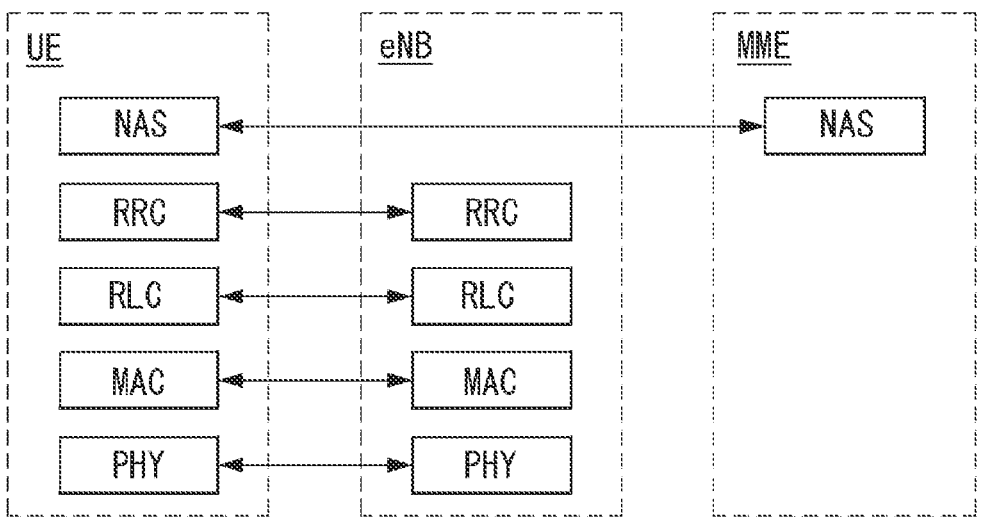
FIG. 4 is a view illustrating an example of a structure of a radio interface protocol in a control plane between user equipment (UE) and evolved node B (eNB).
Figure 5:
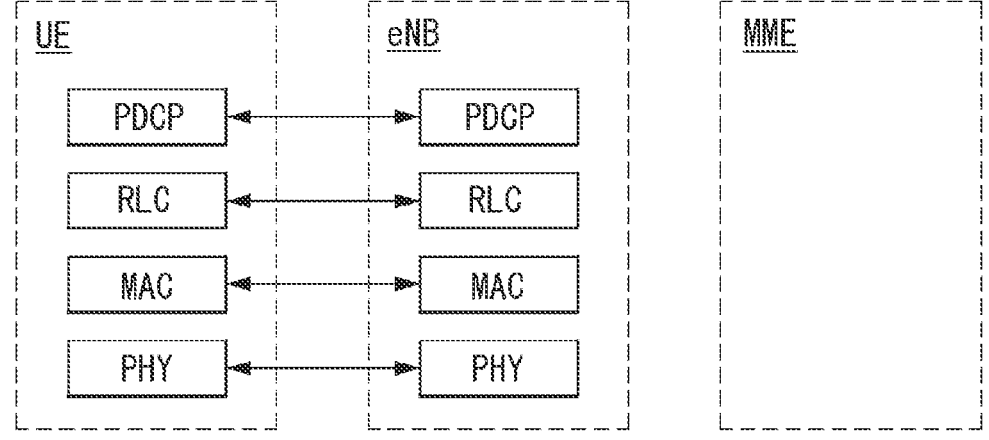
FIG. 5 is a view illustrating an example of a structure of a radio interface protocol in a user plane between UE and eNB.

FIG. 4 is a view illustrating an example of a structure of a radio interface protocol in a control plane between user equipment (UE) and evolved node B (eNB), and FIG. 5 is view illustrating an example of a structure of a radio interface protocol in a user plane between UE and eNB.

The radio interface protocol is based on 3GPP radio access network standard. The radio interface protocol horizontally consists of a physical layer, a data link layer, and a network layer, and is vertically divided into a user plane for data information transmission and a control plane for control signaling delivery.

The protocol layers may be divided into L1 (first layer), L2 (second layer), and L3 (third layer) based upon three lower layers of an open system interconnection (OS1) standard model that is well known in the art of communication systems.

The layers of the radio protocol in the control plane illustrated in FIG. 4 and the layers of the radio protocol in the user plane illustrated in FIG. 5 are described below.

The physical layer, the first layer, provides an information transfer service using a physical channel. The physical layer is connected with a medium access control (MAC) layer located at a higher level via a transport channel, and data between the MAC layer and the physical layer is transferred via the transport channel. Data is transferred between different physical layers, i.e., between physical layers of a transmission side and a reception side via the physical channel.

The physical channel consists of several subframes on a time axis and several subcarriers on a frequency axis. Here, one subframe consists of a plurality of OFDM symbols and a plurality of subcarriers on the time axis. One subframe consists of a plurality of resource blocks, and one resource block consists of a plurality of OFDM symbols and a plurality of subcarriers. A unit time, a transmission time interval (TTI), at which data is transmitted is 1 ms corresponding to one subframe.

Physical channels existing in the physical layers of the transmission side and the reception side may be divided into a physical downlink shared channel (PDSCH) and a physical uplink shared channel (PUSCH) that are data channels, and a physical downlink control channel (PDCCH), a physical control format indicator channel (PCFICH), a physical hybrid-ARQ indicator channel (PHICH), and a physical uplink control channel (PUCCH) that are control channels, according to 3GPP LTE.

There are several layers in the second layer. A medium access control (MAC) layer of the second layer functions to map various logical channels to various transfer channels, and also performs a function of logical channel multiplexing for mapping several logical channels to one transfer channel. The MAC layer is connected to a radio link control (RLC) layer, that is an upper layer, via the logical channel. The logical channel is roughly divided into a control channel used to transmit information of the control plane and a traffic channel used to transmit information of the user plane according to a type of transmitted information.

The MAC layer of the second layer segments and concatenate data received from the upper layer and adjusts a data size so that a lower layer is adapted to transmit data to a radio section.

A packet data convergence protocol (PDCP) layer of the second layer performs a header compression function of reducing an IP packet header size that has a relatively large size and contains unnecessary control information, in order to efficiently transmit data in a radio section having a small bandwidth upon transmission of IP packet such as IPv4 or IPv6. In addition, in the LTE system, the PDCP layer also performs a security function, which consists of ciphering for preventing data interception by a third party and integrity protection for preventing data manipulation by a third party.

A radio resource control (RRC) layer located at the uppermost part of the third layer is defined only in the control plane and is responsible for controlling logical channels, transport channels, and physical channels in relation to configuration, re-configuration, and release of radio bearers (RBs). The RB means services provided by the second layer to ensure data transfer between the UE and the E-UTRAN.

If an RRC connection is established between an RRC layer of the UE and an RRC layer of a wireless network, the UE is in an RRC connected mode. Otherwise, the UE is in an RRC idle mode.

An RRC state of the UE and an RRC connection method are described below. The RRC state refers to a state in which the RRC of the UE is or is not logically connected with the RRC of the E-UTRAN. The RRC state of the UE having logical connection with the RRC of the E-UTRAN is referred to as an RRC_CONNECTED state, and the RRC state of the UE not having logical connection with the RRC of the E-UTRAN is referred to as an RRC_IDLE state. Since the UE in the RRC_CONNECTED state has the RRC connection, the E-UTRAN can identify the presence of the corresponding UE on a per cell basis and thus efficiently control the UE. On the other hand, the E-UTRAN cannot identify the presence of the UE of the RRC_IDLE state, and the UE in the RRC_IDLE state is managed by a core network based on a tracking area (TA) which is an area unit larger than the cell. That is, for the UE in the RRC_IDLE state, only presence or absence of the corresponding UE is identified in an area unit larger than the cell. In order for the UE of the RRC IDLE state to receive typical mobile communication services such as voice and data, the UE should transition to the RRC_CONNECTED state. Each TA is distinguished from another TA by a tracking area identity (TAI) thereof. The UE may configure the TAI through a tracking area code (TAC) which is information broadcasted from a cell.

When the user initially turns on the UE, the UE first searches for a proper cell, and then establishes RRC connection in the corresponding cell and registers information of the UE in the core network. Thereafter, the UE stays in the RRC_IDLE state. The UE staying in the RRC_IDLE state (re)selects a cell and checks system information or paging information, if necessary. This operation is called camping on a cell. Only when the UE staying in the RRC_IDLE state needs to establish the RRC connection, the UE establishes the RRC connection with the RRC layer of the E-UTRAN through a RRC connection procedure and transitions to the RRC_CONNECTED state. There are several cases where the UE remaining in the RRC_IDLE state needs to establish the RRC connection. For example, the cases may include an attempt of a user to make a phone call, an attempt to transmit data, or transmission of a response message when receiving a paging message from the E-UTRAN.

A non-access stratum (NAS) layer positioned over the RRC layer performs functions such as session management and mobility management.

The NAS layer shown in FIG. 4 is described in detail below.

The evolved session management (ESM) belonging to the NAS layer performs functions such as default bearer management and dedicated bearer management to control the UE to use a PS service from a network. The default bearer resources are allocated from a network when they are accessed to the network upon first access to a specific packet data network (PDN). In this instance, the network allocates an IP address available for the UE so that the UE can use a data service, and also allocates QoS of a default bearer. LTE roughly supports two types of bearers including a bearer with guaranteed bit rate (GBR) QoS characteristics for guaranteeing a specific bandwidth for data transmission/ reception and a non-GBR bearer with best effort QoS characteristics without guaranteeing a bandwidth. The default bearer is allocated the non-GBR bearer. The dedicated bearer may be allocated a bearer with GBR or non-GBR QoS characteristics.

A bearer that the network allocates to the UE is referred to as an evolved packet service (EPS) bearer. When the network allocates the EPS bearer to the UE, the network assigns one ID. This ID is called an EPS bearer ID. One EPS bearer has QoS characteristics of a maximum bit rate (MBR) and/or a guaranteed bit rate (GBR).

Figure 6:
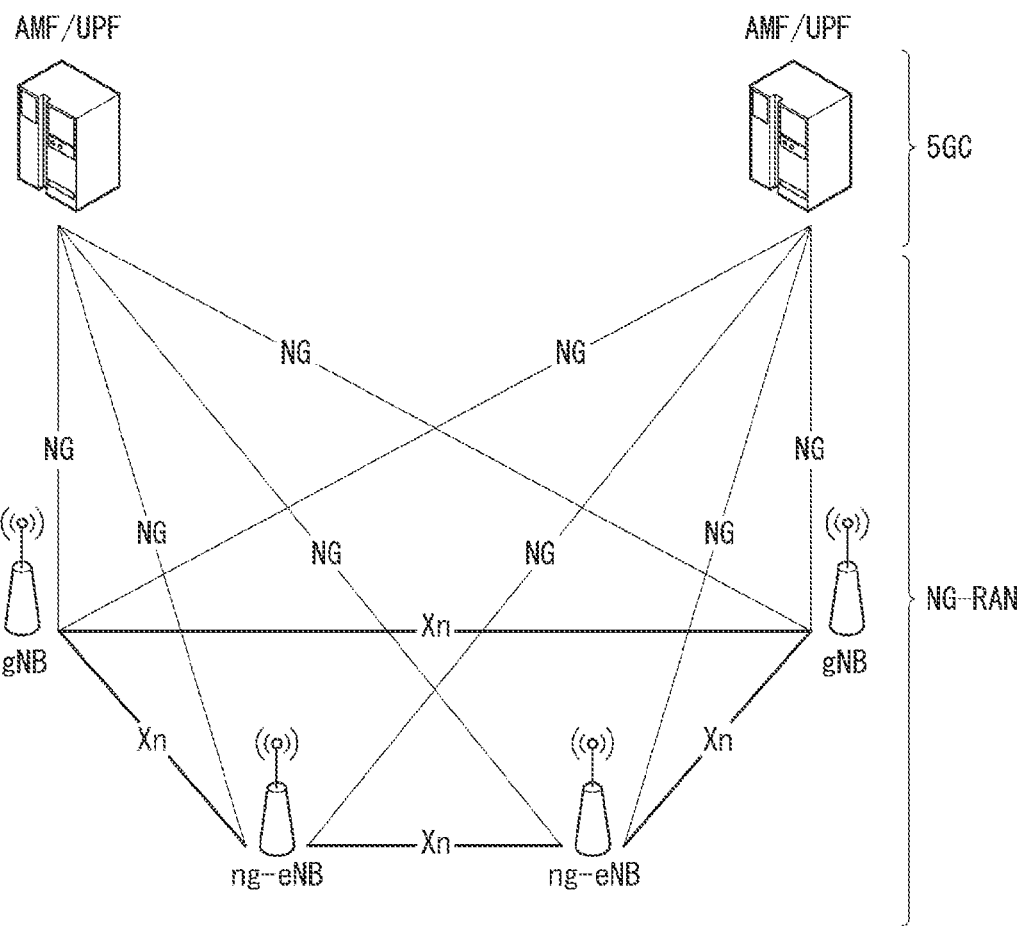
FIG. 6 is a view illustrating an example of an architecture of a general new radio (NR)-radio access network (RAN).

FIG. 6 is a view illustrating an example of an architecture of a general new radio (NR)-radio access network (RAN). Referring to FIG. 6, a NG-RAN node may be one of the following nodes.

gNB providing NR user plane and control plane protocols towards UE, or ng-eNB providing E-UTRA user plane and control plane protocols towards UE gNB and ng-eNB are connected to each other through an Xn interface. In addition, gNB and ng-eNB are connected to an access and mobility management function (AMF) and to a user plane function (UPF) through NG interfaces for 5GC, more particularly, through an NG-C interface and an NG-U interface respectively (refer to 3GPP TS 23.501 [3]).

For reference, an architecture for functional separation and an F1 interface are defined in 3GPP TS 38.401 [4].

Figure 7:
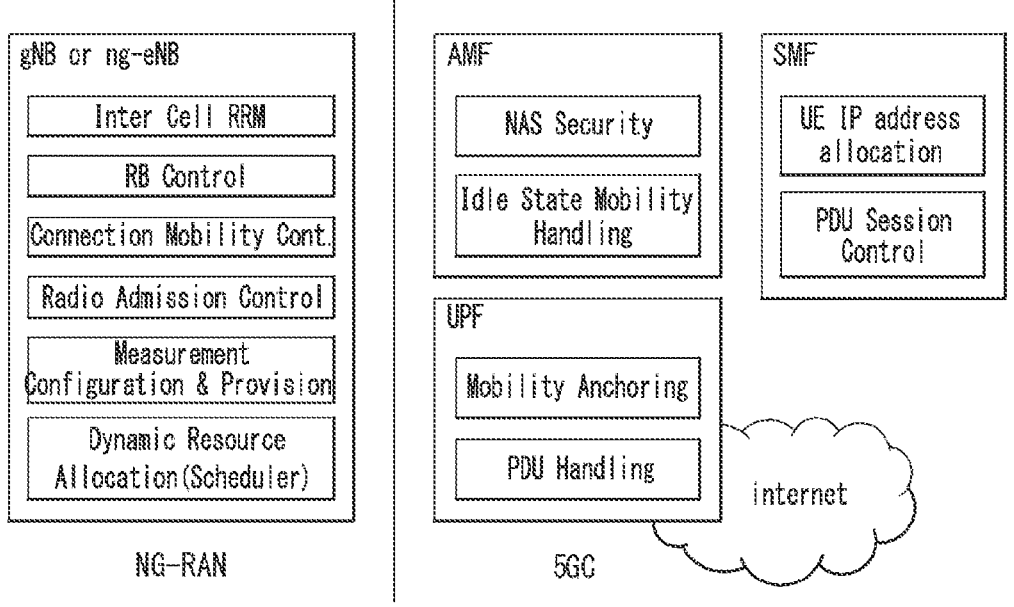
FIG. 7 is a view illustrating an example of functional separation of a general NG-RAN and a 5th generation core (5GC).

FIG. 7 is a view illustrating an example of functional separation of a general NG-RAN and a 5th generation core (5GC). Referring to FIG. 7, a yellow box represents logical nodes, and a white box represents a main function.

gNB and ng-eNB host the following functions.

Wireless resource management function: wireless bearer control, wireless authentication control, access mobility control, and dynamic resource allocation for UE both in uplink and downlink (scheduling)

IP header compression, encryption and data integrity protection

Selecting AMF in IMT-2000 3GPP-UE attachment file, in case routing for AMF cannot be determined based on information provided from UE User plane data routing to UPF Forwarding control plane information to AMF Connection configuration and disconnection Paging message scheduling and transmission System broadcast information scheduling and transmission (provided in AMF or OAM)

Measurement for mobility and scheduling and configuration of measurement report

Transmission-level packet marking of uplink

Session management

Network slicing support

QoS flow management and mapping for data wireless bearer

Support of UE in RRC_INACTIVE state

NAS message distribution function

Radio access network share

Dual connectivity

Closed interworking between NR and E-UTRA

AMF hosts the following main functions (refer to 3GPP TS 23.501 [3]).

NAS signal termination

NAS signal security

AS security control

Signal transfer between CN nodes for moving between 3GPP access networks

Idle mode UE connectivity (including paging retransmission control and execution)

Registration area management

Mobility support inside system and between systems

Access authentication

Access authorization including confirmation of roaming authority

Mobility management control (subscription and policy)

Network slicing support

SMF selection

UPF hosts the following main functions (refer to 3GPP TS 23.501 [3]).

Anchor point for intra-/inter-RAT mobility (if any)

External PDU session point interconnected with data network

Packet routing and forwarding

Packet check and user plane part of policy rule enforcement

Traffic usage report

Uplink classifier supporting traffic flow to data network

Bifurcation for multi-homed PDU session support

QoS processing for user plane (e.g. packet filtering, gate, UL/DL rate enforcement)

Uplink traffic certification (SDF and QoS flow mapping)

Downlink packet buffering and downlink data notification triggering

Session management function (SMF) hosts the following main functions (refer to 3GPP TS 23.501 [3]).

Session management

UE IP address allocation and management

UP function selection and control

Figure 8:
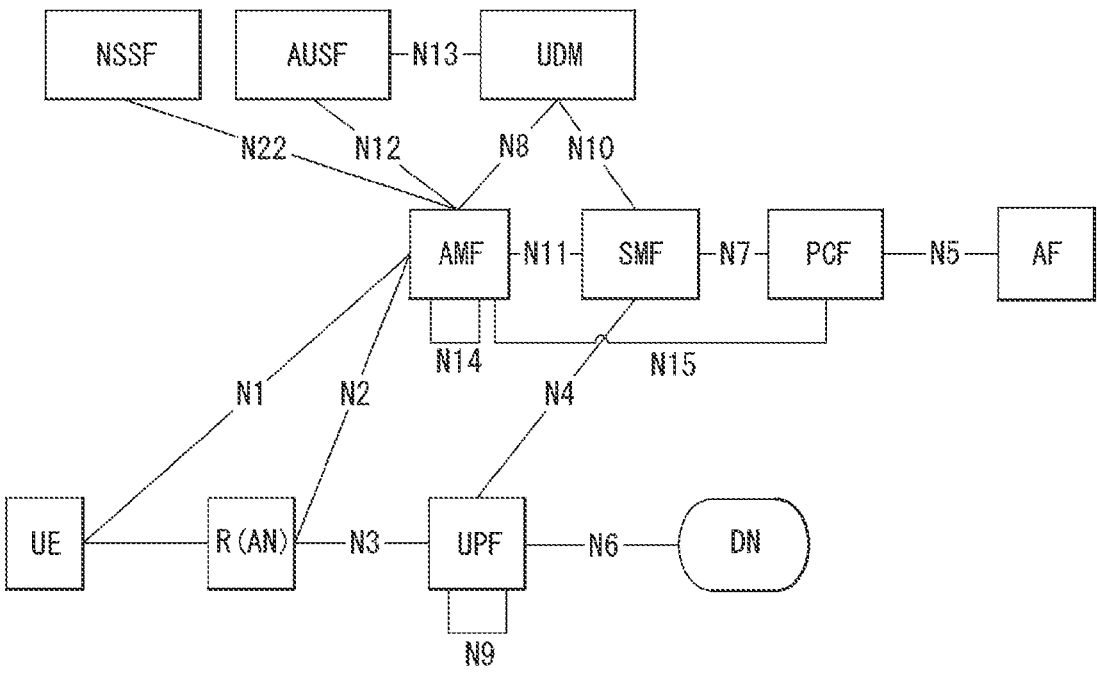
FIG. 8 is a view illustrating an example of a general architecture of a 5th generation (5G) system.

Configuring traffic steering to route traffic to an appropriate destination in UPF Policy enforcement and partial control of QoS Downlink data notification FIG. 8 is a view illustrating an example of a general architecture of a 5th generation (5G) system. Hereinafter, each reference interface and each node in FIG. 8 will be described.

Access and mobility management function (AMF) supports such functions as signaling between CN nodes for mobility between 3GPP access networks, termination of a radio access network (RAN) CP interface (N2), termination of NAS signaling (N1), registration management (registration area), idle mode UE reachability, support of network slicing, and SMF selection.

Some or all the functions of AMF may be supported in a single instance of one AMF.

Data network (DN) means an operator service, an Internet access or 3rd party service and the like, for example. DN transmits a downlink protocol data unit (PDU) or receives a PDU from a UPF, which UE transmits.

Policy control function (PCF) receives information on a packet flow from an application server and provides a function of determining policies like mobility management and session management.

Session management function (SMF) provides a session management function, and when UE has a plurality of sessions, each session may be managed by different SMFs.

Some or all the functions of SMF may be supported in a single instance of one SMF.

Unified data management (UDM) stores a user's subscription data, policy data and the like.

User plane function (UPF) forwards a downlink PDU, which is received from a DN, to UE via (R)AN and forwards an uplink PDU, which is received from UE, to a DN via (R)AN.

Application function (AF) operates with a 3GPP core network for service provision (e.g., for supporting functions like application effect on traffic routing, network capability exposure access, mutual operation with policy framework for policy control).

(Radio) access network ((R)AN) collectively refers to new radio access networks that support both evolved E-UTRA, which is an evolved version of 4G radio access, and a new radio (NR) access technology (e.g. eNB).

gNB supports functions for wireless resource management (that is, radio bearer control, radio admission control, connection mobility control, dynamic allocation of resources to UE in uplink/downlink (that is, scheduling)).

User equipment (UE) means a user device.

In a 3GPP system, a conception link connecting NFs in a 5G system is defined as a reference point.

N1 means a reference point between UE and AMF, N2 means a reference point between (R)AN and AMF, N3 means a reference point between (R)AN and UPF, N4 means a reference point between SMF and UPF, N6 means a reference point between UPF and a data network, N9 means a reference point between 2 core UPFs, N5 means a reference point between PCF and AF, N7 means a reference point between SMF and PCF, N24 means a reference point between PCF in a visited network and PCF in a home network, N8 means a reference point between UDM and AMF, N10 means a reference point between UDM and SMF, N11 means a reference point between AMF and SMF, N12 means a reference point between AMF and authentication server function (AUSF), N13 means a reference point between UDM and AUSF, N14 means a reference point between 2 AMFs, N15 means a reference point between PCF and AMF in the case of non-roaming scenario and a reference point between PCF in a visited network and AMF in the case of a roaming scenario, N16 means a reference point between 2 SMFs (in a roaming scenario, a reference point between SMF in a visited network and SMF in a home network), N17 means a reference point between AMF and 5G-equipment identify register (EIR), N18 means a reference point between AMF and unstructured data storage function (UDSF), N22 means a reference point between AMF and network slice selection function (NSSF), N23 means a reference point between PCF and network data analytics function (NWDAF), N24 means a reference point between NSSF and NWDAF, N27 means a reference point between network repository function (NRF) in a visited network and NRF in a home network, N31 means a reference point between NSSF in a visited network and NSSF in a home network, N32 means a reference point between security protection proxy (SEPP) in a visited network and SEPP in a home network, N33 means a reference point between network exposure function and AF, N40 means a reference point between SMF and charging function (CHF), and N50 means a reference point between AMF and circuit bearer control function (CBCF).

Meanwhile, for convenience of explanation, FIG. 8 exemplifies a reference model for a case in which UE has an access to one DN by using one PDU session, but the present disclosure is not limited thereto.

For convenience of explanation, the above description was based on an EPS system using eNB, but it may be replaced by a 5G system by using gNB instead of eNB, AMF instead of mobility management (MM) function of MME, SMF as SM function of S/P-GW, and UPF as user plane-related function of S/P-GW.

In this specification, the above description was based on EPS, but corresponding contents may also be supported in a 5G system through similar operations through a process/message/information with similar objectives.

Communication System Applicable to the Present Disclosure

Although not limited thereto, various descriptions, functions, procedures, proposals, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Wireless Device Applicable to the Present Disclosure

Figure 9:
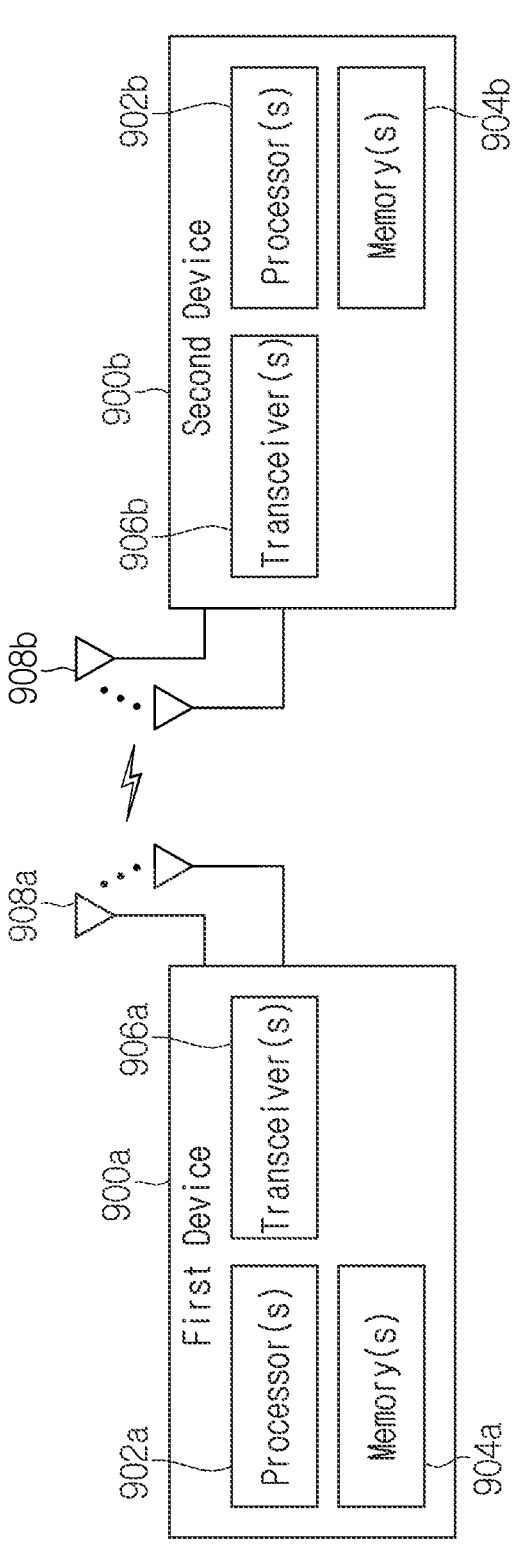
FIG. 9 is a view illustrating an example of a wireless device applicable to the present disclosure.

FIG. 9 is a view illustrating an example of a wireless device applicable to the present disclosure.

Referring to FIG. 9, a first wireless device 900a and a second wireless device 900b may transmit and receive radio signals through various radio access technologies (e.g., LTE, NR). Herein, the first wireless device 900a and the second wireless device 900b may correspond to (the wireless device 100x, the base station 120) and/or (the wireless device 100x, the base station 100x) of FIG. 1.

The first wireless device 900a may include at least one processor 902a and at least one memory 904a and further include at least one transceiver 906a and/or at least one antenna 908a. The processor 902a may be configured to control the memory 904a and/or the transceiver 906a and to implement descriptions, functions, procedures, proposals, methods and/or operational flowcharts disclosed in this document. For example, the processor 902a may process information in the memory 904a, generate first information/signal, and then transmit a wireless signal including the first information/signal through the transceiver 906a. In addition, the processor 902a may receive a wireless signal including second information/signal through the transceiver 906a and then store information obtained from signal processing of the second information/signal in the memory 904a. The memory 904a may be coupled to the processor 902a and store various types of information associated with the operation of the processor 902a.

The second wireless device 900b may include at least one processor 902b and at least one memory 904b and further include at least one transceiver 906b and/or at least one antenna 908b. The processor 902b may be configured to control the memory 904b and/or the transceiver 906b and to implement descriptions, functions, procedures, proposals, methods and/or operational flowcharts disclosed in this document. For example, the processor 902b may process information in the memory 904b, generate third information/signal, and then transmit a wireless signal including the third information/signal through the transceiver 906b. In addition, the processor 902b may receive a wireless signal including fourth information/signal through the transceiver 906b and then store information obtained from signal processing of the fourth information/signal in the memory 904b. The memory 904b may be coupled to the processor 902b and store various types of information associated with the operation of the processor 902b. For example, the memory 904b may perform some or all of the processes controlled by the processor 902b or store software codes including instructions for implementing descriptions, functions, procedures, proposals, methods and/or operational flowcharts disclosed in this document. Herein, the processor 902b and the memory 904b may be a part of a communication modem/circuit/chip designed for implementing a radio communication technology (e.g., LTE, NR). The transceiver 906b may be coupled to the processor 902b and transmit and/or receive a wireless signal through at least one antenna 908b. The transceiver 906b may include a transmitter and/or a receiver. The transceiver 906b is interchangeable with a RF unit. In the present disclosure, a wireless device may also mean a communication modem/circuit/chip.

Wireless Device Structure Applicable to the Present Disclosure

Figure 10:
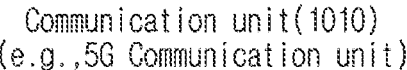
FIG. 10 is a view illustrating another example of a wireless device applicable to the present disclosure.

FIG. 10 is a view illustrating another example of a wireless device applicable to the present disclosure.

Referring to FIG. 10, a wireless device 1300 may correspond to the wireless devices 900a and 900b of FIG. 9 and be composed of various elements, components, units and/or modules. For example, a wireless device 1000 may include a communication unit 1010, a controller 1020, a memory unit 1030, and an additional element 1040. The communication unit may include a communication circuit 1012 and a transceiver(s) 1014. For example, the communication circuit 1012 may include the one or more processors 902a and 902b and/or one or more memories 904a and 904b of FIG. 9. For example, the transceiver(s) 1014 may include the one or more transceivers 906a and 906b and/or one or more antennas 908a and 908b of FIG. 9. The controller 1020 is electrically coupled to the communication unit 1010, the memory unit 1030 and the additional element 1040 and controls an overall operation of a wireless device. For example, the controller 1020 may control an electrical/mechanical operation of a wireless device based on a program/code/instruction/information stored in the memory unit 1030. In addition, the controller 1020 may transmit information stored in the memory unit 1030 to an outside (e.g., another communication device) through the communication unit 1010 via a wireless/wired interface or store information received from an outside (e.g., another communication device) through the communication unit 1010 via a wireless/wired interface in the memory unit 1030.

The additional element 1040 may be configured in various ways according to a type of a wireless device. For example, the additional element 1040 may include at least one of a power unit/battery, an input/output unit, a driving unit, and a computing unit. The wireless device 1000 may be embodied in forms of a robot, a vehicle, an XR device, a hand-held device, a home appliance, an IoT device, a digital broadcasting terminal, a hologram device, a public safety device, an MTC device, a medical device, a fintech device (or financial device), a security device, a climate/environment device, an AI server/device, a base station, and a network node, although not limited thereto. The wireless device may be movable or be used in a fixed place according to a use example/service.

In FIG. 10, various elements, components, units/parts, and/or modules of the wireless device 1000 may all be connected with each other through a wired interface, or at least some may be wirelessly connected through the communication unit 1010. For example, the controller 1020 and the communication unit 1010 in the wireless device 1000 may be connected on a wire, and the controller 1020 and another component may be wirelessly connected through the communication unit 1010. In addition, each of elements, components, units and/or modules in the wireless device 1000 may further include one or more elements. For example, the controller 1020 may be configured by a set of one or more processors. For example, the controller 1020 may be configured by a set of a communication control processor, an application processor, an electronic control unit (ECU), a graphic processing processor, a memory control processor, and the like. As another example, the memory unit 1030 may be configured by a RAM, a dynamic RAM (DRAM), a ROM, a flash memory, a volatile memory, a non-volatile memory, and/or a combination thereof.

Hand-Held Device Applicable to the Present Disclosure

Figure 11:
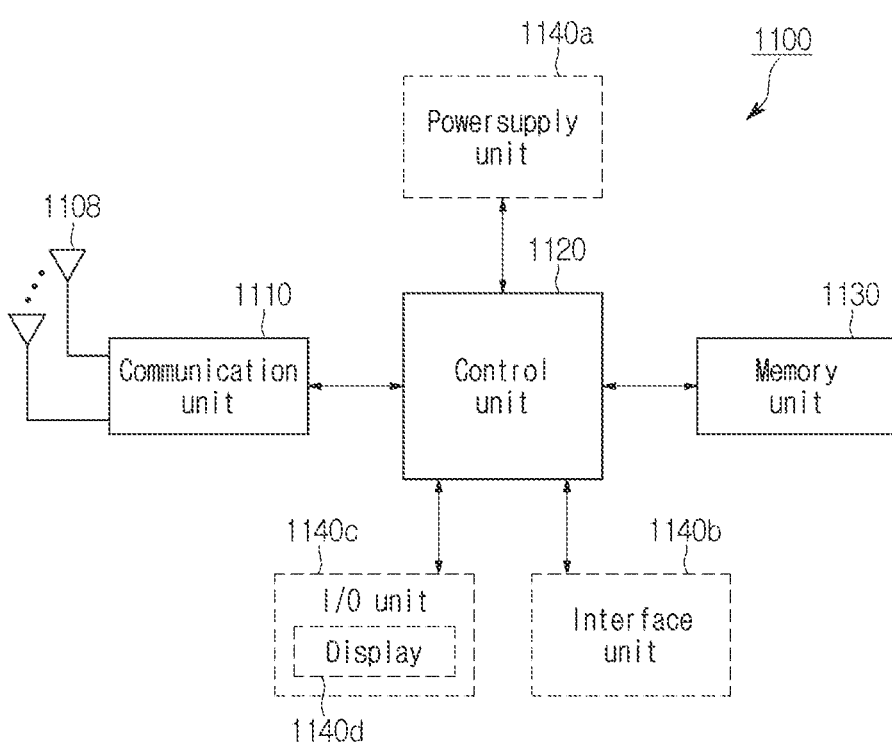
FIG. 11 is a view illustrating an example of a hand-held device applicable to the present disclosure.

FIG. 11 is a view illustrating an example of a hand-held device applicable to the present disclosure.

FIG. 11 exemplifies a hand-held device applicable to the present disclosure. The hand-held device may include a smartphone, a smart pad, a wearable device (e.g., a smart watch, smart glasses), a portable computer (e.g., a notebook and the like) and the like. The hand-held device may be referred to as a mobile station (MS), a user terminal (UT), a mobile subscriber station (MSS), a subscriber station (SS), an advanced mobile station (AMS), or a wireless terminal (WT).

Referring to FIG. 11, a hand-held device 1100 may include an antenna unit 1108, a communication unit 1110, a controller 1120, a memory unit 1130, a power supply unit 1140a, an interface unit 1140b, and an input/output unit 1140c. The antenna unit 1108 may be configured as apart of the communication unit 1110. Blocks 1110~1130/1140a~1140c correspond to the blocks 1010~1030/1040 of FIG. 10, respectively.

The communication unit 1110 may transmit and receive signals (e.g., data, control signals, etc.) to and from another wireless device and base stations. The controller 1120 may perform various operations by controlling components of the hand-held device 1100. The controller 1120 may include an application processor (AP). The memory unit 1130 may store data/parameters/programs/codes/instructions necessary to drive the hand-held device 1100. In addition, the memory unit 1130 may store input/output data/information and the like. The power supply unit 1140a may supply power to the hand-held device 1100 and include a wired/wireless charge circuit, a battery, and the like. The interface unit 1140b may support a connection between the hand-held device 1100 and another external device. The interface unit 1140b may include various ports for connections with external devices (e.g., audio input/output port, video input/output port). The input/output unit 1140c may receive image information/signal, audio information/signal, data, and/or information input from a user as inputs or output these types of information. The input/output unit 1140c may include a camera, a microphone, a user input unit, a display unit 1140d, a speaker and/or a haptic module, and the like.

As an example, in case of data communication, the input/output unit 1140c obtains input information/signal (e.g., touch, character, voice, image, video) from a user, and the obtained information/signal may be stored in the memory unit 1130. The communication unit 1110 may convert information/signal stored in a memory to a wireless signal and transmit the wireless signal thus converted directly to another wireless device or to a base station. In addition, the communication unit 1110 receives a wireless signal from another wireless device or a base station and then restore the received wireless signal to original information/signal. The restored information/signal may be stored in the memory unit 1130 and then be output in various forms (e.g., character, voice, image, video, haptic) through the input/output unit 1140c.

Hereinafter, the present disclosure will describe a method for storing and processing by a terminal a list of subscriber data as SNPN terminal setting information when performing an authentication procedure through an SNPN without credential.

As an example, an NPN may be a private network distinguished from a public network. An SNPN may be a network that does not depend on a public network but operates independently. Accordingly, an SNPN may not support interworking with an evolved packet system (EPS) and not support an emergency service. As another example, an SNPN may not support any roaming service but is not limited to a specific embodiment. That is, an SNPN may be a private network operated independently from a public network.

As an example, when a terminal wants to access an SNPN, the terminal may access the SNPN through a PLMN or perform direct connection to the SNPN but is not limited to a specific embodiment. For convenience of explanation, the description below is based on a case where a terminal directly accesses an SNPN, but is not limited thereto.

Figure 12:
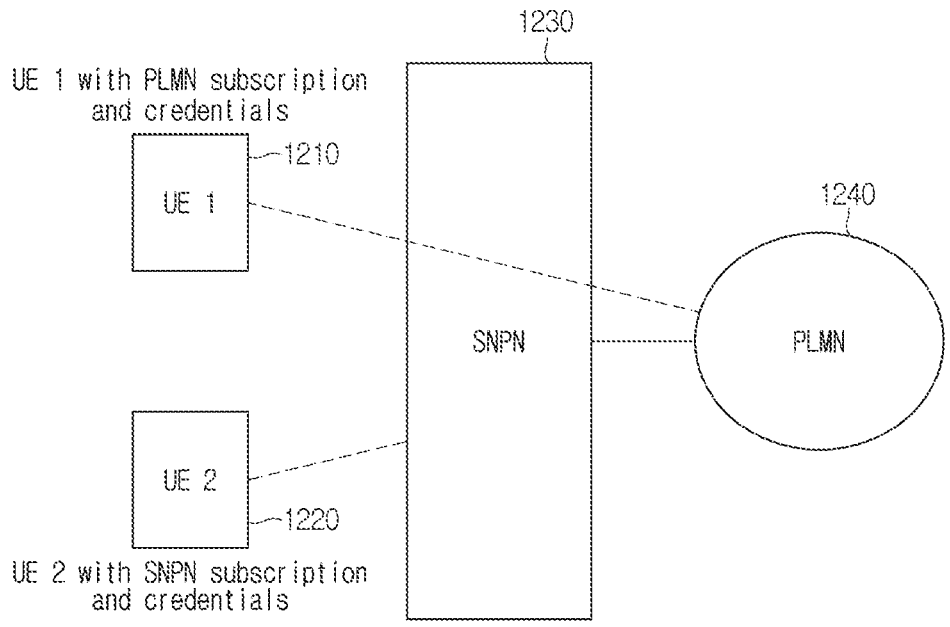
FIG. 12 is a view illustrating a method for performing connection to an SNPN by a terminal applicable to the present disclosure.
Figure 13:
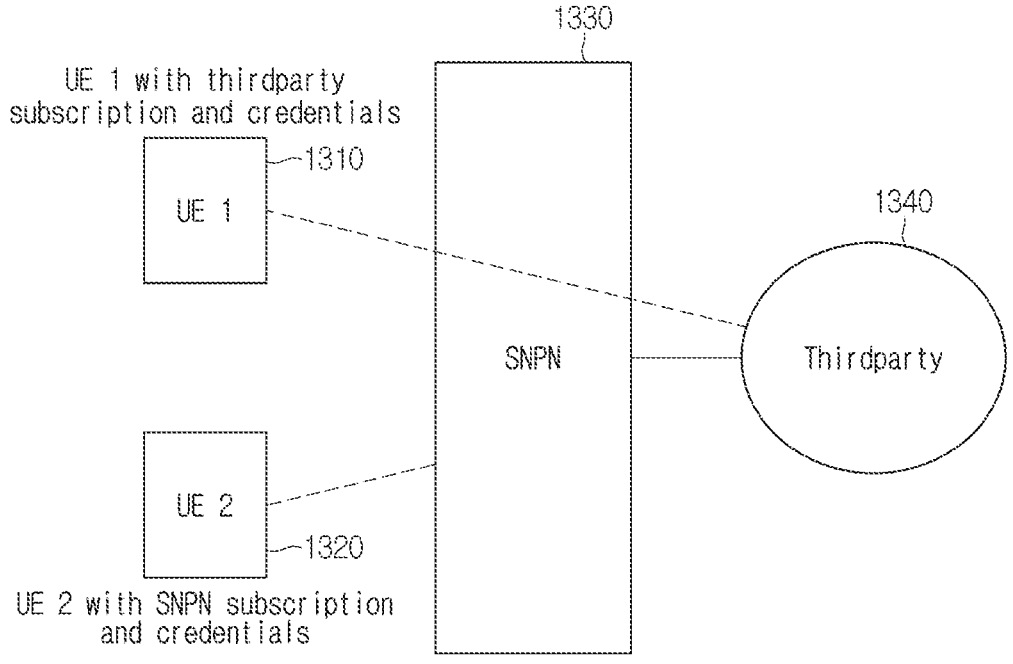
FIG. 13 is a view illustrating a method for performing connection to an SNPN by a terminal applicable to the present disclosure.

As an example, FIG. 12 and FIG. 13 are views illustrating a method for performing connection to an SNPN by a terminal applicable to the present disclosure.

Referring to FIG. 12, a terminal 1 1210 and a terminal 2 1220 may access an SNPN 1230. Herein, an authentication, authorization and accounting (AAA) server for an access credential of the SNPN 1230 may be located outside the SNPN 1230. The AAA server may be a server that manages authentication based on a terminal verification process, authorization based on terminal verification, and an account of a terminal. As a concrete example, the terminal 1 1210 may subscribe to a PLMN 1240 and access the SNPN 1230 by approving a credential for accessing the SNPN 1230 based on the PLMN 1240. On the other hand, the terminal 2 1220 may subscribe to the SNPN 1230, be a terminal that possesses a credential of the SNPN 1230, and perform connection to the SNPN 1230 through the possessed credential.

In addition, as an example, referring to FIG. 13, a terminal 2 1320 may subscribe to an SNPN 1330, similar to FIG. 12, be a terminal that possesses a credential of the SNPN 1330, and perform connection to the SNPN 1330 through the possessed credential. On the other hand, a terminal 1 1310 may obtain authority by proving a credential for connection to the SNPN 1330 based on a third party 1340 and then perform connection to the SNPN 1330. That is, an entity 1340 separated from the SNPN 1330 may have the credential of the SNPN 1330, and the terminal 1 1310 may perform authentication based on the entity having the credential of the SNPN 1330 and obtain connection authority to the SNPN 1330. As an example, the third party entity 1340 may be a credential holder (CH), which will be described below.

Figure 14:
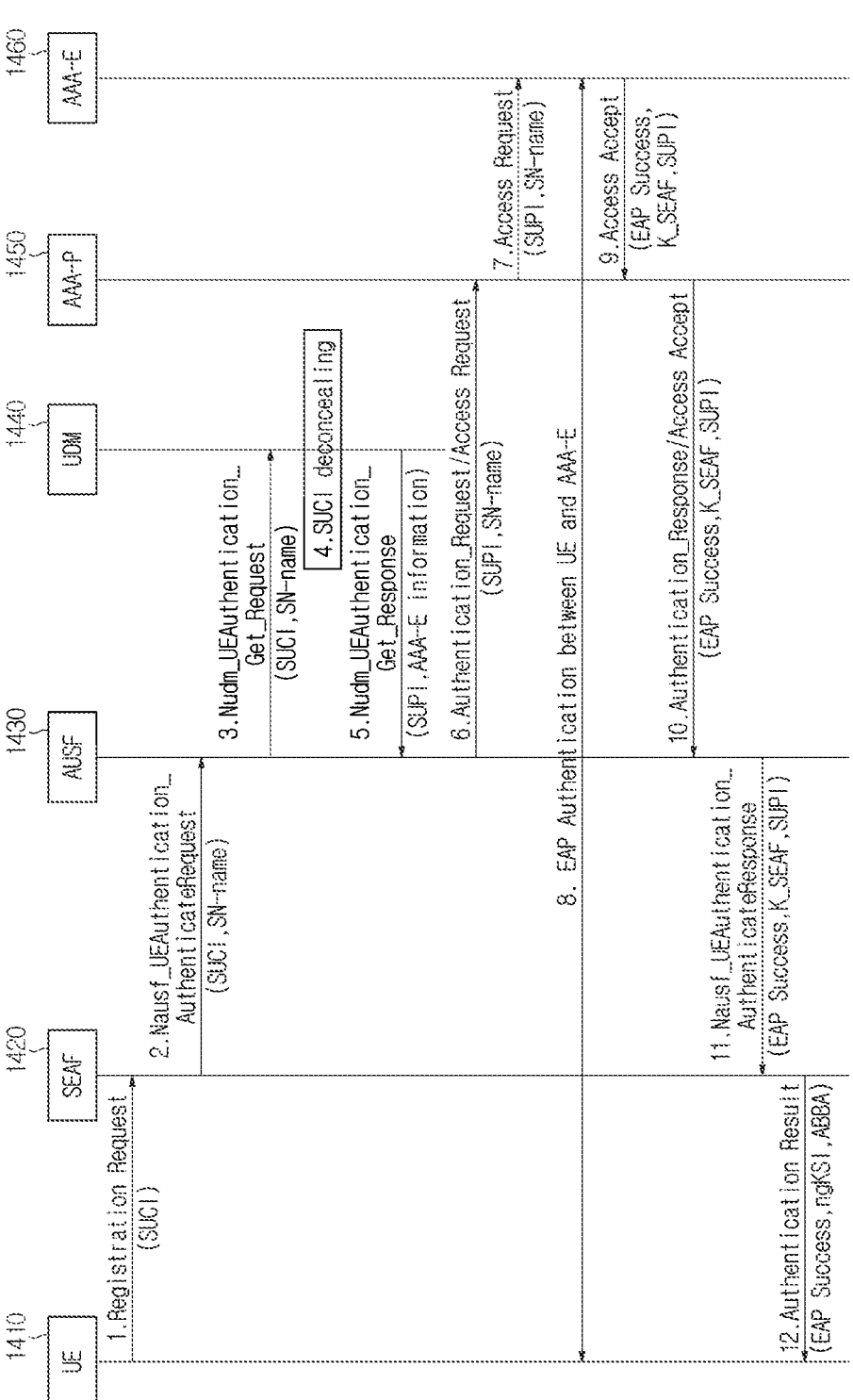
FIG. 14 is a view illustrating a method for proving a credential based on an external entity by a terminal applicable to the present disclosure.

In addition, as an example, FIG. 14 is a view illustrating a method for proving a credential based on an external entity by a terminal applicable to the present disclosure. Referring to FIG. 14, a terminal 1410 may transmit a registration request message including a subscription concealed identifier (SUCI) to a security anchor function (SEAF) 1420. Herein, the SUCI may be generated based on a SUPI of the terminal. Next, the SEAF 1420 may transmit an authentication request message for terminal authentication (e.g., Nausf_UEAuthentication_Authenticate Request message) to an AUSF 1430. As an example, the authentication request message may include the above-described SUCI and information on a serving network name but is not limited thereto.

Next, the AUSF 1430 may forward an authentication acquisition request including the SUCI and a serving network name (e.g., Nudm_UEAuthentication_Get Request) to a UDM 1440. Herein, the UDM 1440 may obtain an SUPI by performing de-concealing for the SUCI and forward an authentication acquisition response including the SUCI information and AAA server information (e.g. Nudm_UE-Authentication_Get Response) to the AUSF 1430. Next, the AUSF 1430 may transmit an authentication and connection request message (e.g., authentication_request/access request) including the SUPI and the serving network name to a proxy AAA (AAA-P) 1450, and the AAA-P 1450 may forward a connection request message (e.g., access request) including the SUPI information and the serving network name information to an AAA-E 1460. The AAA-E 1460 may perform authentication for a terminal based on the SUPT and the serving network name information. When the authentication is completed, the AAA-E 1460 may forward a response message (e.g., access accept) including EAP success and the SUIP to the AAA-P 1450, and the AAA-P 1450 may forward an authentication and connection response message including the EAP success and the SUIP (e.g., authentication_response/access accept) to the AUSF 1430. Herein, the AUSF 1430 may transmit an authentication response message including the EAP success and the SUIP (e.g., Nausf_UEAuthentication_Authenticate Response) to the SEAF 1420. Next, the SEAF 1420 may complete authentication by transmitting a response message (e.g., authentication result) including the EAP success, ngKSI and ABBA to the terminal 1410. That is, based on the above-described procedure, the terminal 1410 may obtain authority by performing authentication for SNPN connection based on a credential holder as an entity outside the SNPN.

In addition, as an example, configuration information for accessing an SNPN may be broadcast through an NG-RAN node providing a SNPN connection. As an example, broadcast information may include at least any one of at least one or more PLMN IDs and NID list information for identifying an NPN accessible through an NG-RAN for each PLMN ID. In addition, as an example, broadcast information may further include at least any one of an indicator indicating whether or not access support is possible for each SNPN through a credential of an external credential holder, a GNI list supported for each SNPN, and information on an indicator indicating whether or not to permit an attempt of registration for terminals not indicated to explicitly select each SNPN, but is not limited to a specific embodiment.

When a terminal obtains an SNPN-related configuration and subscription information based on what is described above, the terminal may obtain at least one or more of a PLMN ID for each SNPN, to which the terminal subscribes, and a network identifier (NID) of the SNPN. In addition, a terminal capable of SNPN connection may obtain at least one of a subscriber identifier (SUPI) and credentials. In addition, a terminal capable of SNPN connection may further obtain at least one of an N3IWF fully qualified domain name (N3IWF FQDN), which is information associated with a non-3GPP interworking function (N3IWF) for accessing a non-3GPP access network, and information on an identifier of a country where the N3IWF is located, but is not limited thereto.

In addition, when SNPN access is supported using a credential of a credential holder for each SNPN to which a terminal subscribes, the terminal may further obtain at least any one of preferred SNPN list information controlled by the terminal, preferred SNPN list information controlled by the credential holder, and GIN list information controlled by the credential holder, but is not limited thereto. Herein, as an example, the preferred SNPN list information controlled by the credential holder and the GIN list information controlled by the credential holder may be updated by the credential holder. Herein, as an example, the above-described pieces of information obtained by the terminal may be broadcast by an NG-RAN, and this is the same as described.

In addition, based on what is described above, a method of selecting an SNPN by a terminal may be considered. As an example, a terminal capable of SNPN access may select an SNPN based on an SNPN access mode.

When the SNPN access mode is not permitted, even a terminal capable of SNPN access may not access an SNPN but perform a PLMN selection procedure. In addition, as regards a terminal capable of simultaneously accessing an SNPN and a PLMN, when an SNPN access mode is set, the terminal may access only to the SNPN, but is not limited thereto.

On the other hand, a terminal for which an SNPN access mode is set may perform connection to an SNPN. Herein, as an example, the terminal may select a network based on whether or not SNPN access is supported through a credential of a credential holder.

As an example, in an automatic network selection mode, the terminal may first access a last connected SPNN. When such preferred access to the last connected SNPN is impossible, the terminal may access an SNPN identified by an SUPI of the terminal, a PLMN ID with a credential, or an NID.

In addition, in case automatic network selection based on what is described above is impossible, when a terminal supports SNPN access by using a credential of a credential holder, the terminal may access through an available SNPN. Herein, the available SNPN may be determined based on at least any one of preferred SNPN list information controlled by the terminal, preferred SNPN list information controlled by the credential holder, and GIN list information controlled by the credential holder. As another example, an available SNPN may be determined based on an SNPN which is not included in the preferred SNPN list information controlled by the credential holder and the GIN list information controlled by the credential holder and not explicitly indicated from an network but available as a credential holder in a terminal, and is not limited to a specific embodiment.

Herein, as an example, one credential could correspond to one SNPN ID in the related art, but there may be a plurality of credentials in one SNPN ID based on what is described above, and there may be a plurality of SNPN IDs in one credential, but the present disclosure is not limited to a specific form. Next, a terminal may select and access one SNPN based on available SNPNs.

In addition, as an example, when SNPN access using a credential of a credential holder is supported in a manual network selection mode, a terminal may identify an SNPN list supporting access through a credential of a credential holder and set it as an available SNPN, but may not be limited to a specific form.

A terminal may select an SNPN based on available SNPNs. Herein, the terminal may construct a list of subscriber data and select an SNPN based on the list of subscriber data. As an example, a list of subscriber data may include at least one of a subscriber ID in a form of SUPI, credential information, and an SNPN identifier. As an example, a list of subscriber data may include setting information for each SNPN based on a terminal and record validity information for each SNPN. As an example, a terminal may not perform connection for an SNPN which is not set as valid in a list of subscriber data. Herein, the terminal may not perform connection to an SNPN set as not valid until a new USIM is inserted or power is switched on again.

As an example, as described above, a terminal capable of SNPN connection may support SNPN access by using a credential of a credential holder (CH). Herein, the credential holder may be an entity separated from an SNPN, perform authentication for SNPN connection of a terminal, and provide access authority.

Figure 15:
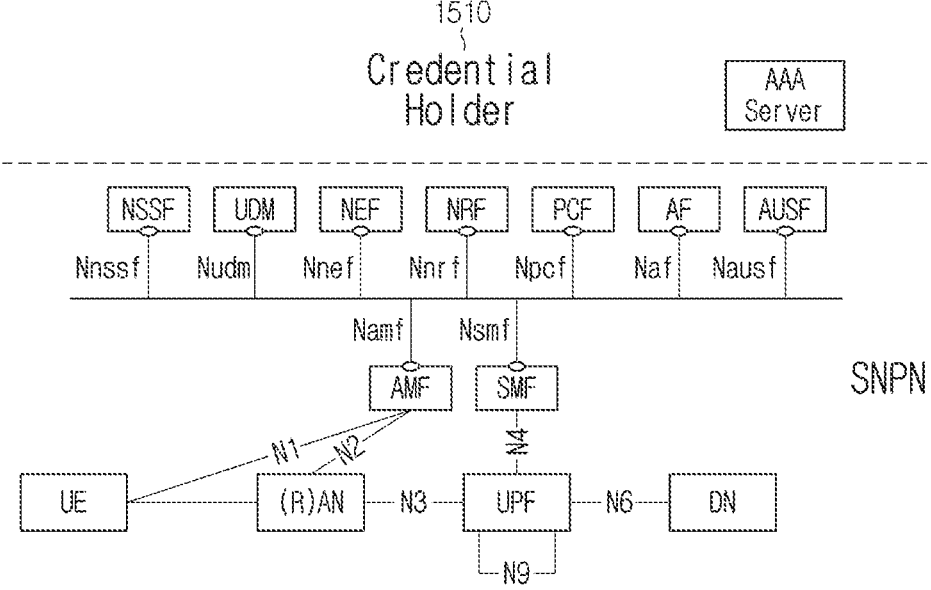
FIG. 15 is a view illustrating a method for performing authentication for SNPN connection based on a credential holder applicable to the present disclosure.

As a concrete example, FIG. 15 is a view illustrating a method for performing authentication for SNPN connection based on a credential holder applicable to the present disclosure. Referring to FIG. 15, a credential holder 1510 may authenticate SNPN connection of a terminal and grant authority through an authentication, authorization and accounting (AAA) server. The AAA server may be a server that manages authentication based on a terminal verification process, authorization based on terminal verification, and an account of a terminal.

As an example, referring to FIG. 15, an authentication server function (AUSF) of an SNPN 1520 may authenticate a terminal and provide authority based on a credential provided from an AAA server within the credential holder 1510. Herein, when a user data management (UDM) of the SNPN 1520 indicates to the AUSF of the SNPN 1520 that authentication is needed based on the AAA server of the credential holder 1510, the AUSF may search and select the AAA server and forward an extensible authentication protocol (EAP) message to the AAA server which serves as an EAP server performing authentication first. Herein, when authentication and authority are provided based on the AAA server, SUPI may be used as information for identifying a terminal. When authentication is completed based on the AAA server, the AMF and SMF of SNPN 152 may read terminal subscription information from the UDM based on the above-described SUPI. Through what is described above, a terminal may perform SNPN connection by performing authentication through a credential of the credential holder 1510 and thus obtaining authority for SNPN connection.

As an example, when a terminal performs connection of an SNPN based on what is described above, the terminal may store setting information of a list of subscribe data in order to manage the SNPN. Herein, if authentication failure occurs in the SNPN selected by the terminal, the terminal may store a subscription corresponding to a selected ID among SNPN IDs in the list of subscribe data, which is the setting information, as an invalid subscription. The terminal stores the setting information based on the list of subscribe data and may prevent data transmission to an SNPN corresponding to the invalid subscription from being performed until a USIN is newly inserted or a power supply is newly switched on. That is, as described above, the terminal may store the setting information based on the list of subscribe data so that unnecessary signaling transmission does not occur for an SNPN that has already failed to be authenticated and another SNPN is selected to efficiently perform SNPN selection.

Herein, as an example, in the related art, when a terminal supports SNPN access, the terminal includes a credential for each SNPN ID and performs connection to an SNPN with a credential. On the other hand, as described above, it is necessary to consider a case where a terminal performs connection to an SNPN through a credential of a credential holder which is an entity separated from the SNPN.

That is, when a terminal supports an SNPN, the terminal may select an SNPN with no credential and perform an authentication procedure by a credential held by the terminal through the selected SNPN. As a concrete example, in case a terminal supports an SNPN, a first SNPN may not be available. Herein, the terminal may perform authentication of a second SNPN by using a credential of the first SNPN. That is, although the terminal has selected an SNPN without a credential of the second SNPN, the terminal may perform connection to the second SNPN by using the credential of the first SNPN.

As an example, when a terminal stores setting information of a list of subscribe data in an existing way, the terminal may store an SNPN for which authentication failure occurs as an invalid SNPN in the list of subscribe data which is the setting information. As a concrete example, in the above-described case, when the terminal performs connection to a second SNPN selected through a credential of a first SNPN, the terminal may not be able to configure connection to the SNPN based on authentication failure. In this case, like in the existing method, if the terminal stores the SNPN, which fails authentication, in the list of subscribe data as setting information, the terminal may set the second SNPN as invalid, and there may be a problem accordingly that connection to not the first SNPN with an actual credential but to the selected second SNPN is prohibited.

As a more concrete example, it is possible to consider a case where a terminal holds Subscription #1 and Subscription #2. Herein, as an example, Subscription #1 may have a credential of SNPN ID #1. That is, the terminal may have the credential of SNPN #1 based on Subscription #1. In addition, as an example, Subscription #2 may have a credential of SNPN ID #2. That is, the terminal may have the credential of SNPN #2 based on Subscription #2.

Herein, as an example, it is possible to consider a case where the terminal performs connection as a credential holder through SNPN #3 by using the credential of SNPN #1. Alternatively, it is possible to consider a case where the terminal performs connection as a credential holder through SNPN #3 by using the credential of SNPN #2.

Herein, in case the terminal selects an SNPN but neither SNPN #1 nor SNPN #2 is available, the terminal may perform an authentication procedure with the credential of SNPN #1 through SNPN #3. Accordingly, when the authentication procedure fails, the SNPN failing the authentication procedure may not be SNPN #3 but be SNPN #1. The terminal should store SNPN #1 as an invalid SNPN in the setting information of a list of subscribe data, but in the above-described case, SNPN #3 may be stored in the list of subscribe data as an invalid SNPN to which the authentication failure occurs. In addition, as an example, when the terminal performs an authentication procedure with a credential of SNPN #2 through SNPN #3 and authentication failure occurs, SNPN #3 may be stored in the list of subscribe data as an invalid SNPN to which authentication failure occurs.

That is, a terminal may store an erroneous SNPN ID in SNPN setting storage information and thus record authentication failure in an SNPN for which an authentication procedure is possible. Accordingly, until the terminal newly inserts a USIM or switches power supply on again, access to a corresponding SNPN (that is, SNPN #3) may be impossible so that an accessible SNPN may not be used.

In addition, since the terminal does not record the SNPNs, which fail authentication, (that is, SNPN #1, SNPN #2) in the setting information of the list of subscribe data, the terminal may perform an authentication procedure by selecting such an SNPN again for which authentication fails. Accordingly, as the terminal performs an unnecessary authentication procedure for an SNPN which is expected to fail authentication, unnecessary signal may occur, and thus a network resource may be wasted. Accordingly, on the side of the terminal, there may occur a problem that the terminal performs an unnecessary operation by accessing an SNPN which will fail authentication, even though the terminal can select another SNPN capable of transmission and have a normal operation.

In consideration of what is described above, when a terminal supports an SNPN, a method for storing and processing modified terminal setting information by a terminal may be needed.

As a concrete example, it is possible to consider a case where a terminal has a credential of a first SNPN based on first subscription. Herein, the terminal may perform connection to a second SNPN through the credential of the first SNPN as a credential holder.

That is, this may be a case where the terminal supports an eNPN and performs connection to the second SNPN by using a credential of a credential holder (e.g., first SNPN). At this time, the terminal may receive an authentication reject message. That is, connection failure may occur to the terminal.

Herein, as described above, to record an SNPN to which authentication failure occur in a list of subscribe data, the terminal may check whether or not a selected SNPN (or current SNPN, that is, second SNPN) and an SNPN with a credential of performing authentication (that is, first SNPN) are identical with each other.

Herein, when the selected SNPN (or current SNPN) and the SNPN with the credential are different from each other, the terminal may select an SNPN with a credential associated with the selected SNPN to set the validity of a corresponding SNPN ID in the list of subscribe data, which is SNPN setting information, as invalid. That is, the terminal may recognize that the first SNPN and the second SNPN are different and set the validity of the first SNPN with a credential in the list of subscribe data as invalid.

As a concrete example, when a terminal selects an SNPN, the terminal may check whether or not access to the SNPN is supported by using a credential of an entity (credential holder) separated from the SNPN. Herein, when the terminal does not support SNPN access using the credential of the entity (credential holder) separated from the SNPN, the terminal may not perform access to another SNPN through the credential of the credential holder. That is, the terminal may perform connection only for an SNPN that has a credential as a subscribed SNPN. Herein, the list of subscribed data may record the validity of an SNPN with authentication failure as an invalid state, which is the same as the existing method, and maintain setting information of the list of subscribe data until a USIM is newly inserted or a power supply is switched on again.

On the other hand, when the terminal supports SNPN access using the credential of the entity (credential holder) separated from the SNPN, the terminal may perform access to another SNPN through the credential of the credential holder. Accordingly, when authentication failure occurs to the terminal, the terminal may record the validity of an entity (that is, credential holder) selected from the list of subscribe data as an invalid state, and maintain setting information of the list of subscribe data until a USIM is newly inserted or a power supply is switched on again.

That is, when the terminal supports SNPN access using a credential of an entity (credential holder) separated from an SNPN, the terminal may record the validity of the credential holder as an invalid state and thus prevent unnecessary signaling in further authentication procedures by recording an SNPN for which actual authentication failure occurs as an invalid state, as described in Table 2 below.

TABLE 2

.

.

.

The UE shall consider the procedure complete.
If the EAP-failure message is received in an AUTHENTICATION REJECT message:
    if the AUTHENTICATION REJECT message has been successfully integrity
    checked by the NAS:
The UE shall set the update status to 5U3 ROAMING NOT ALLOWED, delete the
stored 5G-GUTI, TAI list, last visited registered TAI and ngKSI;
In case of PLMN, the USIM shall be considered invalid until switching off the UE or
the UICC containing the USIM is removed;
In case of SNPN, if the UE does not support access to an SNPN using credential
owned by a CH, the entry of the "list of subscriber data" with the SNPN identity of
the current SNPN shall be considered invalid until the UE is switched off or the entry
is updated. Additionally, the UE shall consider the USIM as invalid for the current
SNPN until switching off or the UICC containing the USIM is removed;
In case of SNPN, if the UE supports access to an SNPN using credential owned
by a CH, a SNPN identity in the "list of subscriber data" allowed by selected
SNPN shall be considered invalid until the UE is switched off or the entry is
updated. Additionally, the UE shall consider the USIM as invalid for a SNPN
identity in the "list of subscriber data" allowed by selected SNPN until switching
off or the UICC containing the USIM is removed;
NOTE: if the UE has multiple subscription and there are more than one subscription
allowed by selected SNPN, which subscription is used is FFS.
The UE shall set:
    the counter for "SIM/USIM considered invalid for GPRS services" events,
    the counter for "USIM considered invalid for 5GS services over non-3GPP
    access" events, and the counter for "SIM/USIM considered invalid for non-
    GPRS services" events if maintained by the UE, in case of PLMN; or
    the counter for "the entry for the current SNPN considered invalid for 3GPP
    access" events and the counter for "the entry for the current SNPN
    considered invalid for non-3GPP access" events in case of SNPN;
to UE implementation-specific maximum value; and
If the UE is operating in single-registration mode, the UE shall handle EMM
parameters, 4G-GUTI, last visited registered TAI, TAI list and eKSI as specified in TABLE 2-continued 3GPP TS 24.301 [15] for the case when the authentication procedure is not accepted
by the network. The USIM shall be considered as invalid also for non-EPS services
until switching off or the UICC containing the USIM is removed; and

.

.

.

In addition, as an example, it is possible to consider a method for selecting an SNPN with an associated with credential by a terminal in case the terminal supports access to an SNPN by using a credential of a credential holder. As an example, a terminal may store an SNPN ID corresponding to subscription to be used by the terminal as a requested SNPN ID. As another example, an SNPN with an associated credential may be selected based on an SNPN preferred by a terminal in an SNPN list.

As yet another example, a network may indicate an SNPN ID of a credential to be used by a terminal to the terminal. Herein, a base station may indicate the SNPN ID of the credential to be used by the terminal through a terminal configuration update message. As an example, an SNPN with an associated credential may be indicated to a terminal based on an SNPN preferred by a credential holder in an SNPN list. In addition, as an example, an available SNPN may be determined based on an SNPN which is not included in the preferred SNPN list information controlled by the credential holder and the GIN list information controlled by the credential holder and not explicitly indicated from an network but available as a credential holder in a terminal, and is not limited to a specific embodiment.

Herein, as an example, when an SNPN (or current SNPN) selected by a terminal and an SNPN with a credential are identical with each other, the terminal may set the validity of a selected SNPN ID in a list of subscribe data, which is SNPN setting information, as invalid. Herein, the validity of SNPN ID may be maintained until a power supply is switched on again or the list of subscribe data is updated.

As another example, it is possible to consider a case where a terminal attempts access and registration procedures for a second SNPN by using a credential of a first SNPN but an authentication procedure fails. Alternatively, it is possible to consider a case where the terminal attempts the access and registration procedures for the second SNPN by using the credential of the first SNPN but the registration procedure fails. Herein, the terminal may check whether or not the first SNPN with an associated credential and an actually selected SNPN (or current SNPN, that is, the second SNPN) are identical with each other. Herein, when the SNPN are different, the terminal may manage the first SNPN by using a second list of the terminal. As an example, the second list may be distinguished from the list of subscribe data, which is a first list. The second list may store not only information of the first SNPN but also information of the second SNPN used for the attempt of registration together with the first SNPN. Then, when the terminal performs access to the second SNPN, the terminal is incapable of using the credential of the first SNPN stored in the second list. However, when the terminal is allowed to access using a credential of a credential holder in another SNPN different from the second SNPN, the terminal may use the credential of the first SNPN and not be limited to a specific form.

In addition, as an example, based on what is described above, when the terminal performs SNPN connection by using a credential of another credential holder different from a credential held by the terminal, the terminal may newly set a counter for the connected SNPN by using the credential of the credential holder.

Specifically, when the terminal receives an NAS message, the terminal may check integrity protection of the received NAS message. As an example, the NAS message may be at least any one of an authentication reject message, a registration reject message, and a service reject message, but there may further be another NAS message, and the present disclosure is not limited to the above-described embodiment.

Herein, the terminal may use the NAS message with integrity protection being confirmed, but not use any message with integrity protection not being confirmed since the message is not trustworthy, and increase a counter (hereinafter, first counter). As an example, the first counter may be a counter for determining invalidity in an SIM/USIM. Herein, when the terminal keeps receiving a message with integrity protection not being confirmed, the first counter may be increased, and when the first counter is increased as large as a preset value, the terminal may determine the set value as an invalid state. That is, the terminal may attempt to receive a message based on integrity as many times as a preset number, and if the reception fails, the terminal may set an invalid state.

Herein, as an example, a counter (hereinafter, second counter) for an SNPN connected using a credential of a credential holder may be different from the above-described first counter. As an example, the second counter may be a counter corresponding to a case where an SNPN is connected using not a credential of the terminal but a credential of another credential holder. As an example, when the terminal receives an NAS message with integrity protection not being confirmed (e.g., authentication reject message), the terminal may attempt to receive an NAS message as many times as a preset number based on the second counter, and when the preset number is exceeded, may set a corresponding SNPN ID with authentication failure as an invalid state.

That is, the second counter, which checks whether or not authentication fails through an SNPN without the credential of the terminal, may be different from the first counter that checks whether or not authentication fails through an SNPN with the actual credential of the terminal. Herein, the second counter may be set to a larger value or a smaller value than the first counter. In addition, as an example, the second counter and the first counter may be set to a same value but may not be limited to a specific form.

Based on what is described above, it is possible to solve the problem that a terminal stores an erroneous SNPN ID in SNPN setting storage information and thus an SNPN capable of succeeding authentication becomes inaccessible. In addition, a terminal may not perform unnecessary signaling by recognizing an SNPN with authentication failure, and thus the normal operation of the terminal may be ensured.

Figure 16:
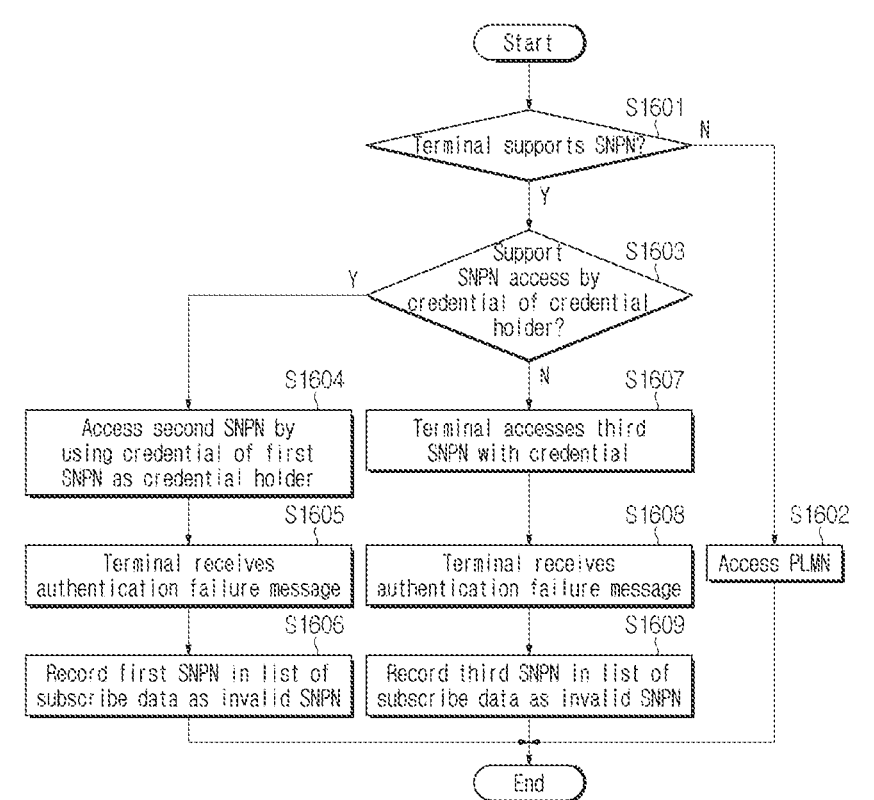
FIG. 16 is a view illustrating a method for accessing an SNPN by a terminal applicable to the present disclosure.

FIG. 16 is a view illustrating a method for accessing an SNPN by a terminal applicable to the present disclosure.

Referring to FIG. 16, a terminal may check whether or not to support an SNPN (S1601). At this time, when the terminal does not support an SNPN, the terminal may perform access to a PLMN, and this is the same as described above (S1602). As another example, when the terminal is capable of simultaneous accessing an SNPN and a PLMN but does not support SNPN access, the terminal may not perform access to the SNPN, and this is the same as described above.

On the other hand, when the terminal supports SNPN support, the terminal may check whether or not SNPN access is supported by using a credential of a credential holder (S1603). Herein, when the terminal supports SNPN access by using a credential of a credential holder, the terminal may perform access to a second SNPN by using a credential of a first SNPN as a credential holder (S1604). Herein, as an example, as for a method of selecting an SNPN with an associated credential, the terminal may store an SNPN corresponding to a subscription to be used by a requested SNPN ID. As another example, the terminal may receive an indication of an SNPN ID of a credential used by the terminal from a network. Herein, the SNPN ID of the credential used by the terminal may be indicated to the terminal through a UE configuration update message but may not be limited to a specific form. Based on what is described above, when the terminal performs access to the second SNPN by using the credential of the first SNPN, the terminal may receive an authentication failure message (S1605). Herein, the terminal may recognize failure of access to the second SNPN based on the authentication failure message and record the validity of an SNPN corresponding to the access failure in a list of subscribe data as an invalid state. Herein, as an example, since the terminal performs access to the second SNPN by using the credential of the first SNPN, the validity of the first SNPN in the list of subscribe data may be recorded as an invalid state (S1606). That is, when terminal fails to access an SNPN based on a credential of a credential holder, the validity of the credential holder may be recorded as an invalid state.

On the other hand, when the terminal does not support access to an SNPN using a credential of a credential holder (S1603), the terminal may perform access to the SNPN through a credential held by the terminal. As an example, the terminal may hold a credential of a third SNPN and perform access to the third SNPN based on the held credential (S1607). Herein, the terminal may recognize failure of access to the third SNPN based on the authentication failure message and record the validity of an SNPN corresponding to the access failure in a list of subscribe data as an invalid state. Herein, since the terminal performs access to the third SNPN by using the credential of the third SNPN, the validity of the third SNPN in the list of subscribe data may be recorded as an invalid state (S1609). That is, since access to a corresponding SNPN is performed through the credential held by the terminal, the validity of the corresponding SNPN may be recorded as an invalid state in the SNPN.

Figure 17:
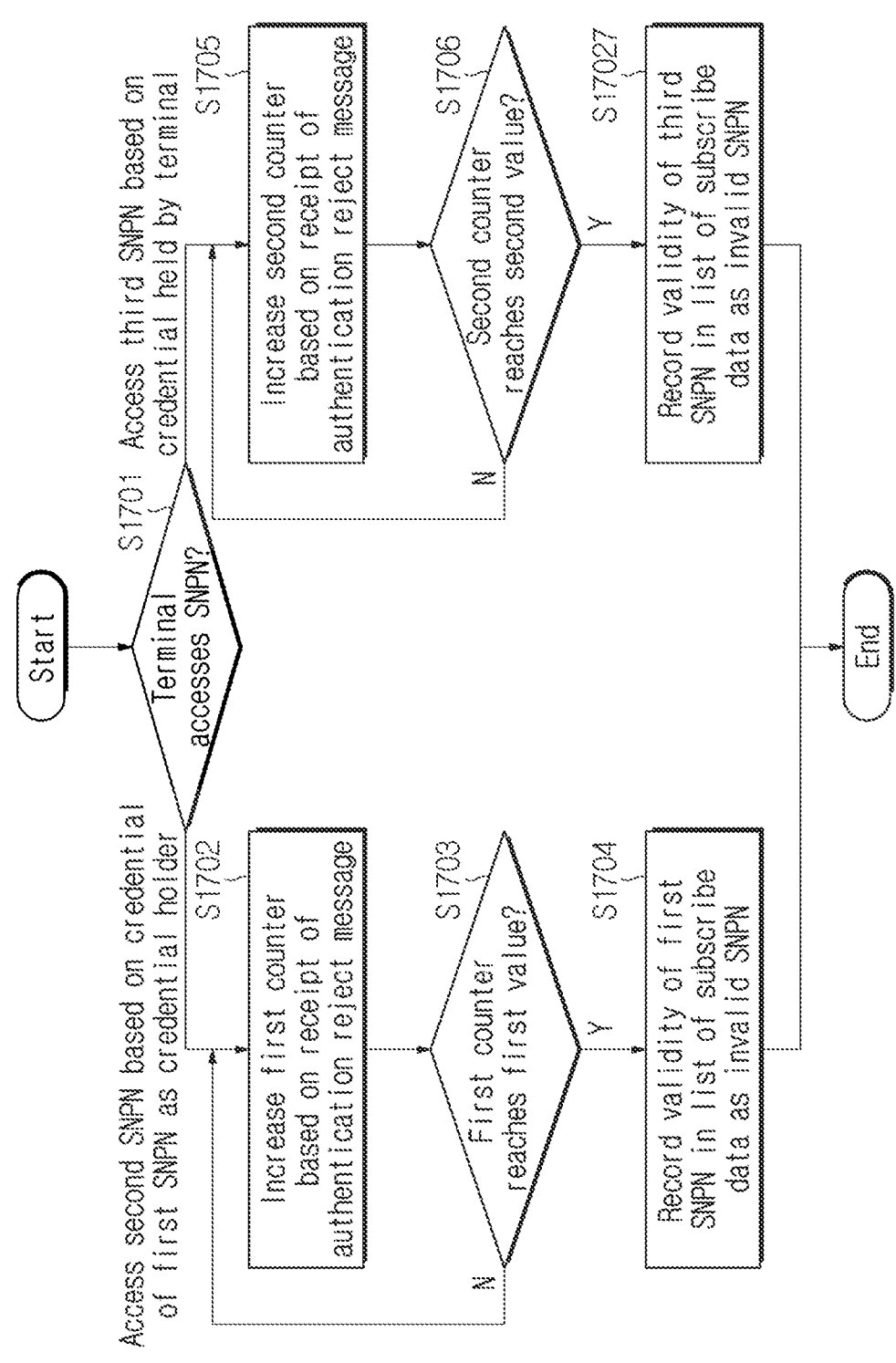
FIG. 17 is a view illustrating a method for accessing an SNPN by a terminal applicable to the present disclosure.

FIG. 17 is a view illustrating a method for accessing an SNPN by a terminal applicable to the present disclosure. As an example, referring to FIG. 17, it is possible to consider a case where a terminal performs access to an SNPN like in FIG. 16 (S1701). Herein, when the terminal performs access to a second SNPN by using a credential of a first SNPN as a credential holder, if the access fails, the terminal may record the validity of the first SNPN in a list of subscribe data as an invalid state, and this is the same as described above. Herein, as an example, the terminal may confirm reception of an authentication reject message to determine access failure. Herein, when receiving the authentication reject message, the terminal may increase a first counter (S1702). Herein, when the first counter reaches a first value as the terminal constantly receives an authentication reject message, the terminal may recognize access failure (S1703). Next, the terminal may record the validity of the first SNPN in the list of subscribe data as an invalid state (S1704).

In addition, as an example, the terminal may perform access to a third SNPN based on a credential held by the terminal. That is, the terminal may perform access to an SNPN by using not a credential of a credential holder but a credential of the SNPN, and this is the same as described above. Herein, as an example, the terminal may confirm reception of an authentication reject message to determine access failure. Herein, when receiving the authentication reject message, the terminal may increase a second counter (S1705). Herein, when the second counter reaches a second value as the terminal constantly receives an authentication reject message, the terminal may recognize access failure (S1706). Next, the terminal may record the validity of the third SNPN in the list of subscribe data as an invalid state (S1707).

Herein, as an example, the first counter and the second counter, which are described above, may be set to different values. That is, a counter for determining authentication failure when accessing to an SNPN using a credential of a credential holder and a counter for determining authentication failure when accessing directly to an SNPN using a credential of the SNPN may be set differently, and this is the same as described above.

Figure 18:
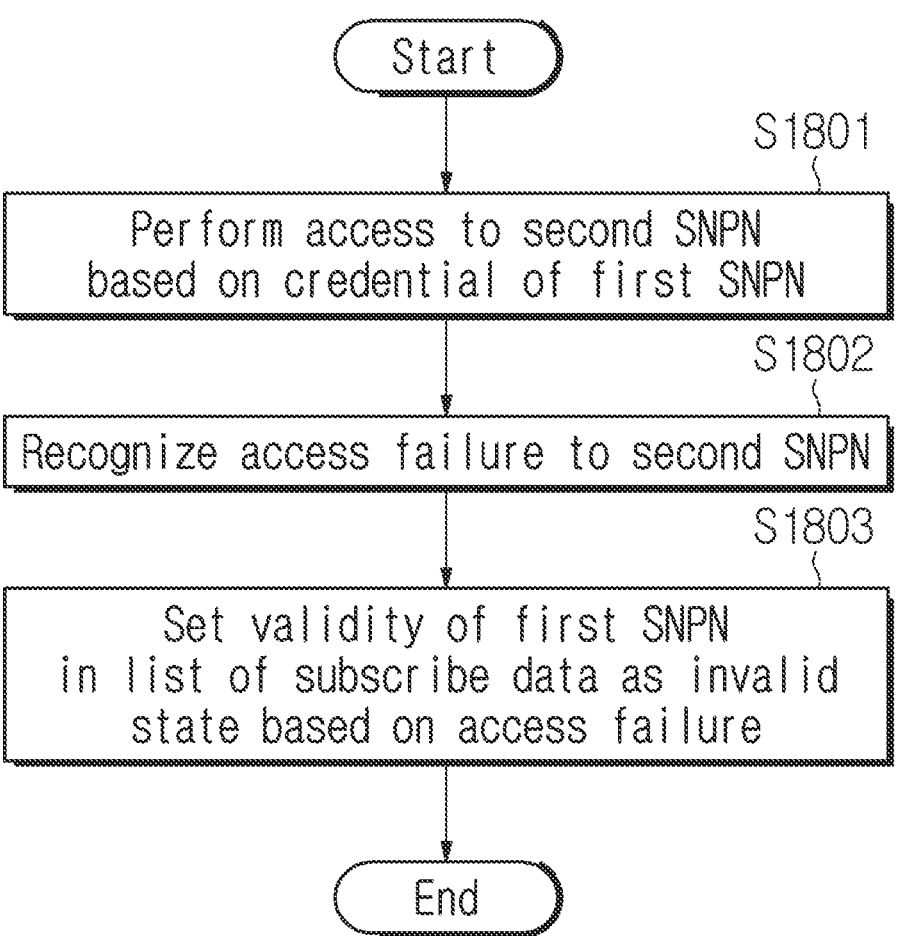
FIG. 18 is a view illustrating a method for operating a terminal applicable to the present disclosure.

FIG. 18 is a view illustrating a method for operating a terminal applicable to the present disclosure.

Referring to FIG. 18, a terminal supporting SNPN access may perform access to a second SNPN based on a credential of a first SNPN as a credential holder (S1810). Herein, when the terminal recognizes failure of access to the second SNPN (S1820), the terminal may set the validity of the first SNPN in a list of subscribe data as an invalid state based on the failure of access (S1830). That is, a credential holder may be recorded as invalid.

Herein, as an example, it may be further checked whether or not the terminal supports SNPN access using a credential of a credential holder. When the terminal supports SNPN access by using a credential of a credential holder, the terminal may perform access to the second SNPN by using the credential of the first SNPN as described above. On the other hand, when the terminal does not support access to an SNPN using a credential of a credential holder, the terminal may perform access to the SNPN based on a credential held by the terminal. As an example, when the terminal performs access to a third SNPN based on a credential of the third SNPN held by the terminal and recognizes failure of the access to the third SNPN, the terminal may set the validity of the third SNPN in the list of subscribe data as an invalid state. That is, the validity of a target SNPN may be set to an invalid state.

In addition, as an example, when the terminal receives a first authentication reject message based on access to the second SNPN by using the credential of the first SNPN, the terminal may increase a first counter, and when the first counter reaches a first value, the terminal may recognize failure of access to the second SNPN. In addition, when the terminal receives a second authentication reject message based on access to the third SNPN by using the credential held by the terminal, the terminal may increase a second counter, and when the second counter reaches a second value, the terminal may recognize failure of access to the third SNPN. Herein, as an example, the first counter and the second counter may be set to different values, and this is the same as described above.

In addition, as an example, the validity of a list of subscribe data may be maintained until a power supply is switched on again or the list of subscribe data is updated, as described above.

As the examples of the proposal method described above may also be included in one of the implementation methods of the present disclosure, it is an obvious fact that they may be considered as a type of proposal methods. In addition, the proposal methods described above may be implemented individually or in a combination (or merger) of some of them. A rule may be defined so that information on whether or not to apply the proposal methods (or information on the rules of the proposal methods) is notified from a base station to a terminal through a predefined signal (e.g., a physical layer signal or an upper layer signal).

The present disclosure may be embodied in other specific forms without departing from the technical ideas and essential features described in the present disclosure. Therefore, the above detailed description should not be construed as limiting in all respects and should be considered as an illustrative one. The scope of the present disclosure should be determined by rational interpretation of the appended claims, and all changes within the equivalent scope of the present disclosure are included in the scope of the present disclosure. In addition, claims having no explicit citation relationship in the claims may be combined to form an embodiment or to be included as a new claim by amendment after filing.

INDUSTRIAL AVAILABILITY

The embodiments of the present disclosure are applicable to various radio access systems. Examples of the various radio access systems include a 3$^{rd}$ generation partnership project (3GPP) or 3GPP2 system.

The embodiments of the present disclosure are applicable not only to the various radio access systems but also to all technical fields, to which the various radio access systems are applied. Further, the proposed methods are applicable to mmWave and THzWave communication systems using ultrahigh frequency bands.

Additionally, the embodiments of the present disclosure are applicable to various applications such as autonomous vehicles, drones and the like.

What is claimed is:

1. A method for operating a terminal in a wireless communication system, the method comprising:

performing, by a terminal supporting standalone non public network (SNPN) access, access to a second SNPN based on a credential of a first SNPN as a credential holder;

identifying failure of the access to the second SNPN; and setting an entry included in a list of subscriber data with a SNPN identity as invalid until the terminal is switched off or the entry is updated, wherein the invalid entry is the first SNPN based on the terminal supporting the SNPN access by using a credential of a credential holder, and the invalid entry is the second SNPN based on the terminal not supporting the SNPN access by using the credential of the credential holder.

2. The method of claim 1, wherein, based on the terminal supporting the SNPN access by using the credential of the credential holder, the terminal performs access to the second SNPN based on the credential of the first SNPN.

3. The method of claim 1, wherein, based on the terminal not supporting the SNPN access by using the credential of the credential holder, the terminal performs the SNPN access based on a credential held by the terminal.

4. The method of claim 3, wherein, based on terminal performing access to a third SNPN based on a credential of the third SNPN held by the terminal and recognizing failure of the access to the third SNPN, the terminal sets validity of the third SNPN in a list of subscribe data as an invalid state.

5. The method of claim 4, wherein, based on the terminal receiving a first authentication reject message based on access to the second SNPN, the terminal increases a first counter, and wherein, based on the first counter reaching a first value, the terminal recognizes failure of the access to the second SNPN.

6. The method of claim 5, wherein, based on the terminal receiving a second authentication reject message based on access to the third SNPN, the terminal increases a second counter, and wherein, based on the second counter reaching a second value, the terminal recognizes failure of the access to the third SNPN.

7. The method of claim 6, wherein the first counter and the second counter are set as different counters.

8. The method of claim 1, wherein the validity of the first SNPN is maintained until a power supply is switched on again or the list of subscribe data is updated.

9. A terminal operating in a wireless communication system, the terminal comprising:

at least one transceiver;

at least one processor; and at least one memory coupled operably with the at least one processor and storing instructions enabling, when executed, the at least one processor to perform a specific operation, wherein the specific operation is configured to:

perform, by a terminal supporting standalone non public network (SNPN) access, access to a second SNPN based on a credential of a first SNPN as a credential holder, identify failure of the access to the second SNPN, and set an entry included in a list of subscriber data with a SNPN identity as invalid until the terminal is switched off or the entry is updated, wherein the invalid entry is the first SNPN based on the terminal supporting the SNPN access by using a credential of a credential holder, and the invalid entry is the second SNPN based on the terminal not supporting the SNPN access by using the credential of the credential holder.

10. A network operating in a wireless communication system, the network comprising:

at least one transceiver;

at least one processor; and at least one memory coupled operably with the at least one processor and storing instructions enabling, when executed, the at least one processor to perform a specific operation, wherein the specific operation controls the transceiver to:

receive a registration request message from a terminal, and to transmit a registration reject message to the terminal, wherein the terminal is a terminal supporting standalone non public network (SNPN) access, and wherein the terminal is configured to:

perform access to a second SNPN, which is the network, based on a credential of a first SNPN as a credential holder, identify failure of the access to the second SNPN based on the registration reject message, and set an entry included in a list of subscriber data with a SNPN identity as invalid until the terminal is switched off or the entry is updated, wherein the invalid entry is the first SNPN based on the terminal supporting the SNPN access by using a credential of a credential holder, and the invalid entry is the second SNPN based on the terminal not supporting the SNPN access by using the credential of the credential holder.

* * * * *